(12) United States Patent
Nagatani et al.

(10) Patent No.: US 6,826,169 B1
(45) Date of Patent: Nov. 30, 2004

(54) CODE MULTIPLEXING TRANSMITTING APPARATUS

(75) Inventors: Kazuo Nagatani, Kawasaki (JP);
Yasuyuki Oishi, Kawasaki (JP);
Hidenobu Fukumasa, Kawasaki (JP);
Hajime Hamada, Kawasaki (JP);
Yoshihiko Asano, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 290 days.

(21) Appl. No.: 09/615,862

(22) Filed: Jul. 13, 2000

Related U.S. Application Data

(62) Division of application No. 08/872,358, filed on Jun. 10, 1997, now Pat. No. 6,097,714.

(30) Foreign Application Priority Data

Dec. 20, 1996 (JP) ............................................ 08-341086

(51) Int. Cl.[7] ............................ H04L 5/12; H04L 27/12; H04B 7/216; H04J 13/00
(52) U.S. Cl. ...................... 370/342; 370/215; 370/335; 370/479; 375/302; 375/308
(58) Field of Search ................................ 370/335, 342, 370/347, 441, 503, 252, 329, 320, 479, 215, 204, 209; 375/130, 140, 302, 308, 142, 150, 227, 293

(56) References Cited

U.S. PATENT DOCUMENTS

| | | | | |
|---|---|---|---|---|
| 4,347,616 A | * | 8/1982 | Murakami | 375/293 |
| 5,038,341 A | | 8/1991 | Berman et al. | |
| 5,119,399 A | * | 6/1992 | Santos et al. | 375/224 |
| 5,228,055 A | * | 7/1993 | Uchida et al. | 375/142 |
| 5,414,728 A | * | 5/1995 | Zehavi | 375/142 |
| 5,469,468 A | * | 11/1995 | Schilling | 375/130 |
| 5,546,381 A | * | 8/1996 | Fukushima | 370/479 |
| 5,548,613 A | * | 8/1996 | Kaku et al. | 375/150 |
| 5,550,811 A | * | 8/1996 | Kaku et al. | 370/342 |
| 5,668,795 A | | 9/1997 | Magill et al. | |
| 5,687,166 A | * | 11/1997 | Natali et al. | 370/209 |
| 5,737,329 A | * | 4/1998 | Horiguchi | 370/342 |
| 5,757,853 A | | 5/1998 | Tsujimoto | |
| 5,793,798 A | | 8/1998 | Rudish et al. | |
| 5,805,567 A | * | 9/1998 | Ramesh | 370/204 |
| 5,825,806 A | | 10/1998 | Tuttle et al. | |
| 5,903,556 A | * | 5/1999 | Matui | 370/342 |
| 6,028,894 A | * | 2/2000 | Oishi et al. | 375/227 |
| 6,104,745 A | * | 8/2000 | Koh | 375/130 |
| 6,295,273 B1 | * | 9/2001 | Wakabayashi | 370/215 |
| 6,320,842 B1 | * | 11/2001 | Mochizuki | 370/206 |
| 6,418,133 B1 | * | 7/2002 | Zhang et al. | 370/342 |
| 6,438,118 B1 | * | 8/2002 | Matui | 370/335 |

FOREIGN PATENT DOCUMENTS

| | | |
|---|---|---|
| JP | 55038776 | 3/1980 |
| JP | 02305237 | 12/1990 |
| JP | 05130191 | 5/1993 |
| JP | 09139693 | 5/1997 |

* cited by examiner

*Primary Examiner*—Man Phan
(74) *Attorney, Agent, or Firm*—Katten Muchin Zavis Rosenman

(57) ABSTRACT

A code multiplexing transmitting apparatus spread-spectrum modulates transmission data of a plurality of channels by spreading codes that differ from one another, combines the spread-spectrum signals of each of the channels and transmits the resultant spread-spectrum modulated signal. A spread-spectrum modulating unit for each channel includes a phase shifter for shifting, by a predetermined angle channel by channel, the phase of a position vector of the spread-spectrum modulated signal of each channel. As the result of such phase control, the phases of pilot signal portions of the spread-spectrum modulated signals of the respective channels are shifted relative to one another so that the peak values of the code-multiplexed signal can be suppressed.

24 Claims, 20 Drawing Sheets

| SYMBOL ($V_i, V_q$) | $V_i', V_q'$ | | | |
|---|---|---|---|---|
| | 0th CHANNEL AMOUNT OF PHASE SHIFT =0 | 1st CHANNEL AMOUNT OF PHASE SHIFT =$\pi$/2 | 2nd CHANNEL AMOUNT OF PHASE SHIFT =$\pi$ | 3rd CHANNEL AMOUNT OF PHASE SHIFT =3$\pi$/2 |
| 0 0 (-1 -1) | 0 0 | 1 0 | 1 1 | 0 1 |
| 1 0 (1 -1) | 1 0 | 1 1 | 0 1 | 0 0 |
| 1 1 (1 1) | 1 1 | 0 1 | 0 0 | 1 0 |
| 0 1 (-1 1) | 0 1 | 0 0 | 1 0 | 1 1 |

FIG. 9

| | Pilot | Data | | | |
|---|---|---|---|---|---|
| | | | ←P→ ←Data→ ←P→ | | P=Pilot |
| USER (0th CHANNEL) | 0 | 0 | 0 | 0 | |
| USER (1st CHANNEL) | $\frac{\pi}{2}$ | | $\frac{\pi}{2}$ | $\frac{\pi}{2}$ | |
| USER (2nd CHANNEL) | $\pi$ | | $\pi$ | $\pi$ | |
| USER (3rd CHANNEL) | $\frac{3\pi}{2}$ | | $\frac{3\pi}{2}$ | $\frac{3\pi}{2}$ | |

PHASE CONTROL VALUES

| | Pilot | Data | P\|←  Data  →\|P P=Pilot |
|---|---|---|---|
| USER 0 (0 th CHANNEL) | $\theta_0=0$ | | ←———— 0 ————→ |
| USER 1 (1st CHANNEL) | $\theta_1$ | | $\theta_1$ ←——— 0 ———→ $\theta_1$ |
| USER 2 (2nd CHANNEL) | $\theta_2$ | 0 | $\theta_2$ ←——— 0 ———→ $\theta_2$ |
| USER 3 (3rd CHANNEL) | $\theta_3$ | | $\theta_3$ ←——— 0 ———→ $\theta_3$ |
| USER 4 (4th CHANNEL) | $\theta_4$ | | $\theta_4$ ←——— 0 ———→ $\theta_4$ |
| USER N-1 (N-1 th CHANNEL) | $\theta_{N-1}$ | | $\theta_{N-1}$ ←——— 0 ———→ $\theta_{N-1}$ |

FIG.26 PRIOR ART

CODE MULTIPLEXING TRANSMITTING APPARATUS

This is a divisional of application Ser. No. 08/872,358, filed Jun. 10, 1997 and now U.S. Pat. No. 6,097,714 allowed.

BACKGROUND OF THE INVENTION

This invention relates to a code multiplexing transmitting apparatus and, more particularly, to a code multiplexing transmitting apparatus for spread-spectrum modulating signals of a plurality of channels by respective ones of codes that differ from one another, combining the spread-spectrum modulated signals of each of the channels and transmitting the resultant spread-spectrum modulated signal.

Wireless access using CDMA (Code Division Multiple Access) has been studied and is being put to use as the next generation of digital mobile communication. CDMA is a method of multiple access using spread-spectrum communication. Specifically, transmission information of a plurality of channels or users is multiplexed by coding and transmitted over a transmission path such as a radio link.

Spread-spectrum communication is a method of modulation that is different from ordinary narrow-band modulation. In spread-spectrum communication, the bandwidth of a signal after modulation is made very large in comparison with that of the narrow band in narrow-band modulation. With spread-spectrum communication, two-stage modulation/demodulation is performed in the transceiver.

FIG. 16 is a structural view illustrating the operating principle of a transmitter in spread-spectrum communication. Shown in FIG. 16 are a modulator 1 such as a (phase-shift keying) PSK modulator, a spreading circuit 2, a power amplifier 3 and an antenna 4. The positions of the modulator 1 and spreading circuit 2 may be interchanged. The spreading circuit 2 includes a spreading code generator 2a for outputting a rectangular spreading code sequence (see FIG. 17) that randomly takes on levels of ±1 referred to as a pseudorandom noise (PN) sequence, and a multiplier 2b for multiplying digital transmission data, which has been modulated by the modulator 1, by the spreading code.

As shown in FIG. 17, the speed at which the spreading code changes (namely duration Tc of the rectangular wave) is set so as to change over at a very high rate in comparison with symbol changeover speed (one bit interval T of the PSK-modulated signal) of the narrow-band modulated signal that is modulated by the spreading code. That is, T>>Tc holds. The duration of T is referred to as the "bit duration", the duration of Tc is referred to as the "chip duration", and the reciprocals of these are referred to as the "bit rate" and "chip rate", respectively. The ratio of T to Tc (i.e. T/Tc) is referred to as the "spreading ratio".

The spectrum distribution of a spread-spectrum modulated signal exhibits the shape of a sinc function, as shown in FIG. 18. The bandwidth of a main lobe ML is equal to twice the chip rate (i.e. ML=2/Tc), and the bandwidth of a side lobe SL is 1/Tc. Since the PSK signal prior to spread-spectrum modulation is an ordinary PSK signal modulated at the bit rate 1/T, the occupied bandwidth is 2/T. Accordingly, if the occupied bandwidth of the spread-spectrum modulated signal is made the bandwidth (=2/Tc) of the main lobe, the bandwidth of the original PSK-modulated signal will be broadened T/Tc times by applying spread-spectrum modulation. The energy is diffused as a result. FIG. 19 is an explanatory view illustrating the manner in which bandwidth is enlarged by spread-spectrum modulation. Shown in FIG. 19 are a narrow bandwidth-modulated signal NM and a spread-spectrum modulated signal SM.

FIG. 20 is a structural view illustrating the operating principle of a receiver in spread-spectrum communication. Shown in FIG. 20 are an antenna 5, a wide-band bandpass filter 6 for passing only signals of necessary frequency bands, a de-spreading circuit 7, a bandpass filter 8 and a detector circuit 9 such as a PSK demodulator. The de-spreading circuit 7 has a construction identical with that of the spreading circuit 2 on the transmitting side and includes a spreading code generator 7a for outputting a rectangular spreading code sequence the same as that on the transmitting side, and a multiplier 7b for multiplying the output signal of the bandpass filter 6 by the spreading code.

The wide-band reception signal sent to the receiver is restored to the original narrow-band modulated signal via the de-spreading circuit 7 similar to the spreading circuit on the transmitting side. This is followed by the generation of a baseband waveform via the detector circuit 9, which is of the ordinary type. The reason why the narrow-band modulated signal is obtained by the de-spreading circuit 7 is as set forth below.

As shown in FIG. 21, let a(t) represent the modulated wave on the transmitting side, c(t) the spreading code sequence (spreading code) and x(t) the transmitted waveform. These are related as follows:

$$x(t)=a(t) \cdot c(t)$$

If attenuation and the effects of noise during transmission are neglected, the transmitted waveform x(t) arrives on the receiving side intact. The spreading code sequence used by the de-spreading circuit 7 has a waveform exactly the same as that of the spreading code used in spread-spectrum modulation on the transmitting side, as mentioned above. Accordingly, the output y(t) of the de-spreading circuit 7 is given by the following equation:

$$y(t)=x(t) \cdot c(t)=a(t) \cdot c^2(t)$$

The output signal y(t) enters the bandpass filter 8. Passing this signal through the bandpass filter is the same as integrating the signal. Thus the output of the bandpass filter is given by the following equation:

$$\int y(t)dt = a(t) \cdot \int c^2(t)dt$$

The integral on the right side of this equation is an autocorrelation value obtained when the shift in time is made zero. The autocorrelation value is unity. Accordingly, the output of the bandpass filter is a(t) and the modulating information signal is obtained.

Code division multiple access (CDMA) is a method of communication using a different spreading code for each channel or user, whereby the information transmitted on the respective channels is multiplexed by the codes. FIG. 22 is a diagram for describing the principle of CDMA on two channels. Shown in FIG. 22 are a transmitter TR in which CH1 is a first channel, CH2 a second channel and CMP a combining unit, and first and second receivers RV1, RV2, respectively.

An important point in CDMA is the "similarity" of the spreading codes used by each of the channels. When almost identical spreading codes are used by each of the channels, the channels interfere with each other severely. A so-called "correlation value" is a measure of the degree to which interference between channels occurs. The correlation value is defined by the following equation with respect to two waveforms a(t) and b(t):

$$R=\int a(t)\cdot b(t)dt \quad T: \text{period}$$

The integration is carried out over one period T of a(t), b(t). We have R=1 when a(t) and b(t) are exactly identical waveforms and R=−1 when the waveforms are of opposite signs. On the average, looking at one period, the value of R obtained is zero when there is no relationship between the value of a(t) at a certain time and the value of b(t) at the same time.

Consider the first receiver RV1 in a situation where CDMA is performed using, as the spreading code, two waveforms $c_1(t)$ and $c_2(t)$ of such a combination that the correlation value R is zero. The signals from the first and second channels CH1 and CH2 arrive at the first receiver RV1. When the first receiver RV1 de-spreads the received signals using the code $c_1(t)$, a bandpass filter $8_1$ outputs a signal represented by the following equation:

$$\int\{a_1(t)c_1(t)c_1(t)+a_2(t)c_2(t)c_1(t)\}dt$$

The $\int\{a_2(t)c_2(t)c_1(t)\}dt$ part of this is zero because the correlation value between $c_2(t)$ and $c_1(t)$ is zero. Further, $\int c_1(t)c_1(t)dt$ is unity since this is an autocorrelation value in which the displacement in time is zero. Accordingly, the output of the bandpass filter $8_1$ of the first receiver RV1 is $a_1(t)$ and the influence of the signal making use of $c_2(t)$ as the spreading code is entirely absent. The same is true for the second receiver RV2. This will hold even if the number of simultaneously connected communication channels is increased. However, it is required that the correlation value be zero for the spreading codes of all combinations.

In mobile wireless communication, wireless base stations emit radio waves (generate spreading code sequences) at the same timing (i.e. synchronously). It will suffice, therefore, to select spreading code sequences in such a manner that the correlation value will be zero between the spreading code sequences. It should be noted that since one wireless mobile station will not emit radio waves at the same timing as other wireless mobile stations, mutual influence cannot be measured merely by the correlation value. Accordingly, the correlation values of $c_1(t)$ and $c_2(t)$ are not merely compared; it is required that the correlation values be observed for a case where $c_1(t)$ and $c_2(t)$ are shifted arbitrarily in time.

FIG. 23 is a diagram showing the construction of a CDMA transmitter which code-multiplexes and transmits data on a number of channels. This illustrates the construction of a prior-art base station in wireless mobile communication, by way of example. As shown in FIG. 23, the transmitter includes spread-spectrum modulators $11_1$~$11_n$ of 1st through nth channels, respectively. Each spread-spectrum modulator includes a frame generator 21, a serial/parallel (S/P) converter 22 for converting frame data to parallel data, and a spreading circuit 23. The frame generator 21 has a transmission data generator 21a for generating serial transmission data $D_1$, a pilot signal generator 21b for generating a pilot signal which is peculiar to a base station, and a frame forming unit 21c for forming the serial data $D_1$ (see FIG. 24) into blocks every prescribed number of bits and inserting the pilot signal P at the beginning and end of each block, thereby producing data frames. The frame generators 21 of each of the spread-spectrum modulators $11_1$~$11_n$ insert identical pilot signals P into the transmission data at the same timing. The purpose of the pilot signal P is to allow the receiver to recognize the amount of phase rotation of the spread-spectrum modulated signal due to transmission. In other words, the pilot signals are used to perform de-spreading by allowing the receiver to detect the amount of phase rotation of the spread-spectrum modulated signal in the transmission path from the position of the transmitted pilot and the position of the received pilot, and to restore the phase of the spread-spectrum modulated signal by an amount equivalent to the amount of phase rotation.

The S/P converter alternately distributes the frame data (the pilot signals and transmission data) one bit at a time to convert the frame data to I-component (in-phase component) data $D_I$ and Q-component (quadrature-component) data $D_Q$, as shown in FIG. 24.

The spreading circuit 23 includes a pseudorandom noise (pn) sequence generator 23a for generating a pn sequence (long spreading code) which is peculiar to the base station, an orthogonal Gold code generator 23b for generating an orthogonal Gold code (short spreading code) for user identification, an EX-OR gate 23c for obtaining the exclusive-OR between the pn sequence and the orthogonal Gold code and outputting a resulting code $C_1$, and EX-OR gates 23d, 23e for performing spread-spectrum modulation by obtaining the exclusive-ORs between the data $D_I$ and $D_Q$, respectively, and the code $C_1$. It should be noted that since "1" is level 1 and "0" is level −1, the exclusive-OR between signals is the same as the product between them.

Also shown in FIG. 23 are a combiner 12i for outputting an I-component code-multiplexed signal $\Sigma V_I$ by combining the I-component spread-spectrum modulated signals $V_I$ output by the respective spreading circuits $11_1$~$11_n$; a combiner 12q for outputting a Q-component code-multiplexed signal $\Sigma V_Q$ by combining the Q-component spread-spectrum modulated signals $V_Q$ output by the respective spreading circuits $11_1$~$11_n$; FIR-type digital chip shaping filters 14i, 14q for limiting the bandwidths of the code-multiplexed signals $\Sigma V_I$, $\Sigma V_Q$, respectively; DA converters 14i, 14q for converting the digital outputs of the respective filters 13i, 13q to analog signals; a quadrature modulator 15 for applying quadrature phase-shift keying (QPSK) modulation to the code-multiplexed signals $\Sigma V_I$, $\Sigma V_Q$ of the I and Q components and outputting the modulated signal; a power amplifier 16 for amplifying the output of the quadrature modulator 15, and an antenna 17.

The quadrature modulator 15 includes a carrier generator 15a for outputting a carrier wave cos ωt having a prescribed frequency, a 90° phase shifter 15b for shifting the phase of the carrier wave by 90° and outputting −sin ωt, a multiplier 15c for multiplying the output signal of the DA converter 14i by cos ωt, a multiplier 15d for multiplying the output signal of the DA converter 14q by −sin ωt, and a combiner 15e for combining the outputs of the multipliers 15c and 15d.

FIG. 25 is a diagram showing the construction of the orthogonal Gold code generator 23b. The code generator 23b includes a first M (maximum-length code) sequence generator 23b-1, a second M sequence generator 23b-2, an exclusive-OR gate 23b-3 for obtaining the exclusive-OR between the first and second M sequences, and a "0" add-on unit 23b-4 for adding a "0" onto the end of the sequence outputted by the exclusive-OR gate 23b-3.

The first M sequence generator 23b-1 has a 6-bit shift register SF1 and an exclusive-OR gate EOR1, generates the M sequence $$A=\{a_i, i=0, 1, 2, \ldots, N-2\}$$

by performing the operation represented by a primitive polynomial $X^6+X+1$ and adds "0" onto the end of the M sequence A, thereby generating a sequence U, of sequence length $N=2^n$, expressed by the following equation:

$$U=(a_0, a_1, a_2 \ldots a_{N-2}, 0)=(A,0)$$

The second M sequence generator 23b-2 has a 6-bit shift register SF2 and an exclusive-OR gate EOR2, generates the M sequence $$B=\{b_i, i=0, 1, 2, \ldots, N-2\}$$

by performing the operation represented by a primitive polynomial $X^6+X^5+X^3+X^2+1$ and adds "0" onto the end of the M sequence B, thereby generating a sequence $V_j$, of sequence length $N=2^n$, expressed by the following equation:

$$V_j=[T_j(b_0, b_1, b_2 \ldots b_{N-2}), 0]=(T_jB,0)$$

where $T_jB$ is the result of shifting the sequence B by j. The orthogonal Gold code is produced from the sequences U, $V_j$ and is composed of a set of N sequences.

The first M sequence generator 23b-1 generates the sequence U (the initial value of the shift register SF1 being made 000001). The second M sequence generator 23b-2, on the other hand, generates the sequence B with '000000' being the initial value of the shift register SF2, and generates the sequence $V_j$ by shifting the sequence B (N−1) times. Next, the exclusive-OR gate 23b-3 obtains the exclusive-OR between the sequences U and $V_j$ and outputs (N−1) items of data. After the (N−1) items of data are output, the "0" add-on unit 23b-4 outputs "0" as the N-th item of data, thereby generating a first orthogonal code sequence $G_1$.

Next, the first M sequence generator 23b-1 generates the sequence U (the initial value of the shift register SF1 being made 000001). The second M sequence generator 23b-2, on the other hand, generates the sequence B with '000000' being the initial value of the shift register SF2, and generates the sequence $V_j$ by shifting the sequence B (N−2) times. Next, the exclusive-OR gate 23b-3 obtains the exclusive-OR between the sequences U and $V_j$ and outputs (N−1) items of data. After the (N−1) items of data are output, the "0" add-on unit 23b-4 outputs "0" as the N-th item of data, thereby generating a second orthogonal code sequence $G_2$.

Thereafter, and in similar fashion, (N−2) sequences $G_3 \sim G_N$ are generated. As a result, a set of a total of N sequences $G_1 \sim G_N$ is obtained. A feature of these codes is orthogonality between the code sequences. FIG. 26 shows an example of 64 orthogonal Gold code sequences, each having a code length of 64 bits, generated in the manner described above. The last value of each sequence is "0".

A multiplexed signal of pilots in a case where code multiplexing has been performed using the above-mentioned orthogonal Gold codes with pilots in phase is expressed as follows, where the data dealt with is (−1, +1):

$$MultiCode_{pilot} = \sum_i^{user} (ogold_i \times Pilot \times PN)$$

$$= Pilot \times PN \times \sum_i^{user} (ogold_i)$$

$$= C \times \sum_i^{user} (ogold_i)$$

Consider the right side of this equation. The amplitude of the multiplexed signal takes on the maximum value at the portion where "0" is given as the Nth item of data when the orthogonal Gold codes are generated ("0" corresponds to the −1 level), as shown in FIG. 27. The reason for this is that since the amplitude (the outputs of the combiners 12i, 12q in FIG. 24) of a multiplexed signal in CDMA is the sum of the voltages of all multiplexed channels, the maximum value is obtained when the orthogonal Gold codes are all "0"s or all "1"s.

Thus, in pilot-insertion type CDMA, pilot signals are added on frame by frame and the pilot signals are spread-spectrum modulated by orthogonal codes (orthogonal Gold codes) for user identification and a pn sequence. Let n represent the number of channels. After code multiplexing n-number of spread-spectrum modulated signals that have been generated, a CDMA base station applies QPSK modulation and then transmits the modulated signal. When the n channels of spread-spectrum modulated signals are code-multiplexed in such a CDMA base station, the pilot signals are in common for each of the channels and the output timings of the pilot signals of each of the channels are the same. Consequently, the power of the signal obtained by n-code multiplexing the spread-spectrum modulated signals develops peak values at the points where the pilot signals reside, as shown in FIG. 28. This is a problem in that these peaks of the multiplexed signal act as interference waves with respect to other stations.

Another factor is that the input/output characteristic of a power amplifier is linear up to a certain input level but becomes non-linear when this level is exceeded. FIG. 29 shows an example of an AM-AM characteristic (input power vs. gain characteristic) of a power amplifier, and FIG. 30 shows an example of an AM-PM characteristic (input power vs. phase characteristic) of a power amplifier. It will be understood from these characteristic curves that the gain characteristic and phase characteristic of a power amplifier are flat and so is the input/output characteristic as long as the input power is small. There is also no phase rotation under these conditions. However, when the input power exceeds a certain level, gain starts to decline, a phase lag develops and each characteristic becomes non-linear. It is required to use a power amplifier with a high power efficiency and it is necessary to raise the mean power level of the input signal. When the mean power level of the input signal is raised, however, the peak value of the code-multiplexed signal exceeds the linear region and saturates and the peak values at the locations of the pilot signals are clipped, as shown in FIG. 31. As a result, when this code-multiplexed signal is de-spread on the receiving side, the pilot signal power becomes small in comparison with the power of the other data, pilot detection error increases and the amount of phase rotation can no longer be recognized. The result is that data can no longer be demodulated correctly. If the mean power level of the input signal is used upon being reduced, a problem which arises is a decline in the power efficiency of the power amplifier.

SUMMARY OF THE INVENTION

Accordingly, an object of the present invention is to reduce the peak values of identical signal portions, e.g. the pilot signal portions, of identical timings in the code-multiplexed signal.

Another object of the present invention is to make it possible to reduce the power of radio waves which interfere with other stations, thereby increasing system capacity.

A further object of the present invention is to make efficient use of the power amplifier.

In accordance with the present invention, the foregoing objects are attained by providing a code multiplexing transmitting apparatus for spread-spectrum modulating transmission data of a plurality of channels by spreading codes that differ from one another, combining the spread-spectrum modulated signals of each of the channels and transmitting the resultant spread-spectrum modulated signal, comprising a phase shifter for shifting, by a predetermined angle channel by channel, phase of a signal-point position vector of the spread-spectrum modulated signal of each channel.

Other features and advantages of the present invention will be apparent from the following description taken in conjunction with the accompanying drawings.

BRIEF DESCRIPTION OF THE DRAWINGS

FIG. 9 is a diagram useful in describing a phase-shift control value (amount of phase shift);

Figure 26:
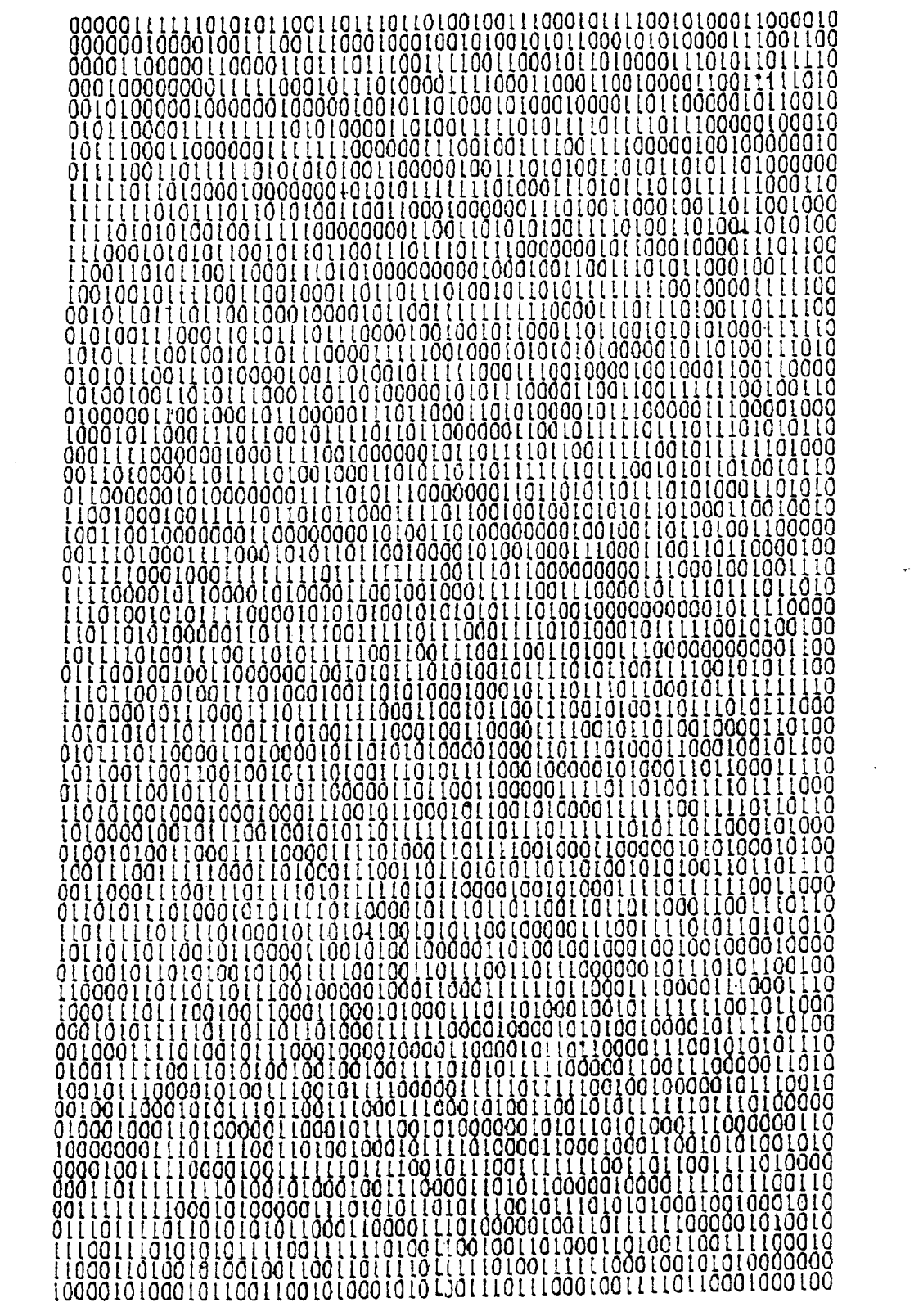

FIG. 26 is a diagram for describing orthogonal Gold codes;

DESCRIPTION OF THE PREFERRED EMBODIMENTS (A) Overview of the Invention

Figure 1:
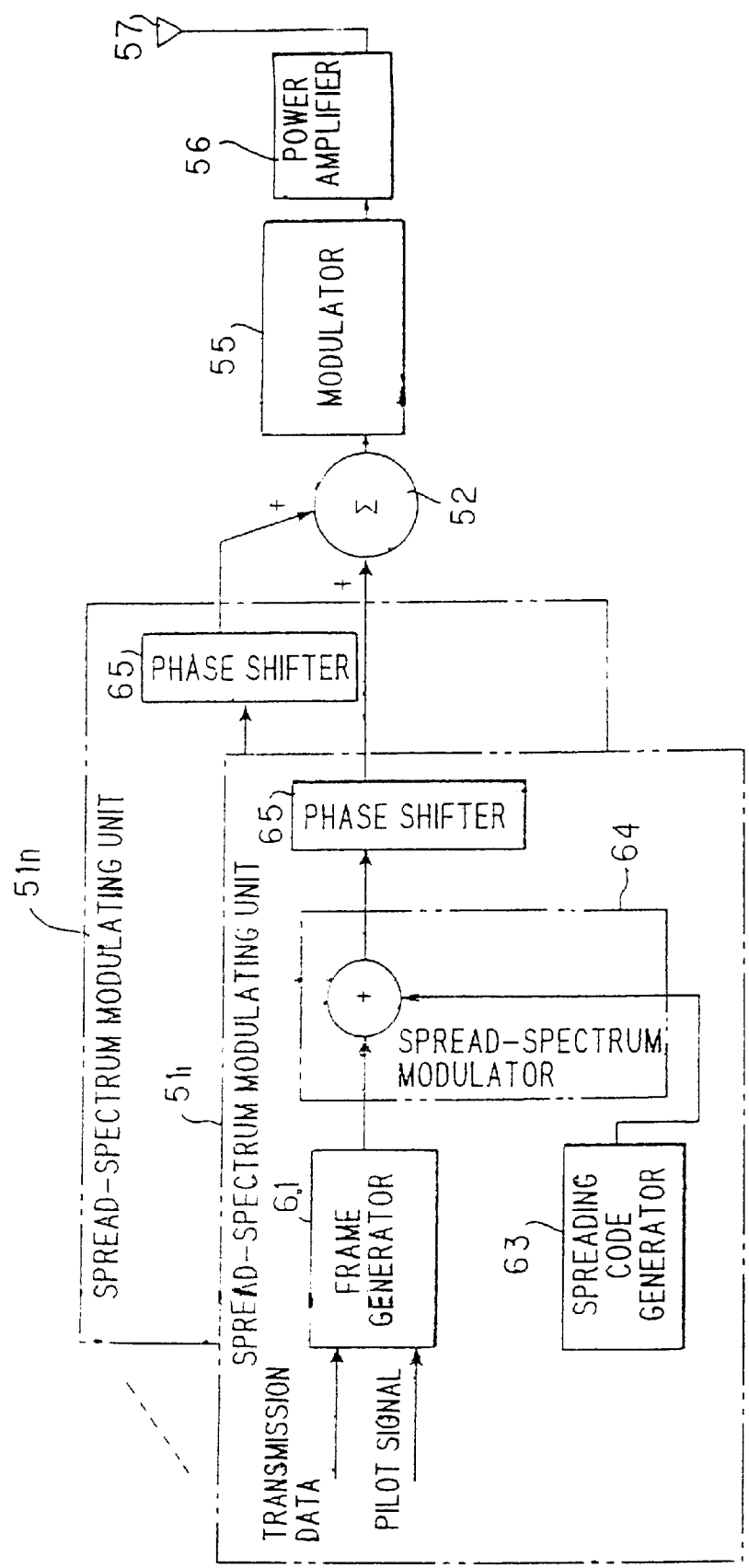
FIG. 1 is a block diagram illustrating the principle of the present invention.

FIG. 1 is a diagram useful in describing an overview of a code multiplexing transmitting apparatus according to the present invention.

Spread-spectrum modulating units $51_1 \sim 51_n$ of 1st~nth channels each include a frame generator 61 for generating a frame signal by inserting pilot signals into transmission data every predetermined number of items of data, a spreading code generator 63 for generating a spreading code, a spread-spectrum modulator 64 for spread-spectrum modulating the frame signal by the spreading code, and a phase shifter 65 for shifting, by a predetermined angle channel by channel, the phase of a signal-point position vector of the spread-spectrum modulated signal. A code-multiplexed signal generator 52 multiplexes the spread-spectrum modulated signals of the respective channels, the output of the code-multiplexed signal generator 52 is input to a modulator 55 such as a quadrature phase-shift keying (QPSK) modulator, the output of the modulator 55 is applied to a transmitting power amplifier 56, and the amplified signal from the amplifier 56 is input to an antenna 57.

Unless the signal-point position vectors of the spread-spectrum modulated signals of respective channels are shifted in phase, the pilot signals will be the same on each of the channels and the output timings of the pilot signals on each of the channels will be identical. As a consequence, the power of the signal (the output signal of the code-multiplexed signal generator 52) obtained by code-multiplexing the spread-spectrum modulated signals of respective channels will develop peak values at the pilot signal portions, these peak portions will produce interference in other stations and the power efficiency of the power amplifier will decline.

Accordingly, the phase shifter 65 in the spread-spectrum modulating unit $51_1 \sim 51_n$ of each channel shifts, by a predetermined angle channel by channel, the phase of the signal-point position vector of the spread-spectrum modulated signal of each channel. For example, the phase shifter 65 of an ith channel makes the phase-shift angle θ of the ith channel equal to 360°·i/N and phase-shifts the position vector by an amount equivalent to this phase-shift quantity θ, where N represents the number of channels. Alternatively, the phase shifter 65 of each channel stores amount of phase shift in correspondence with spreading codes, obtains an amount of phase shift that conforms to the spreading code used in spread-spectrum modulation and rotates the signal by an amount equivalent to the phase-shift quantity. If this arrangement is adopted, the phases of the pilot signal portions of the spread-spectrum modulated signals output by the spread-spectrum modulators $51_1$~$51_n$ of the respective channels will be shifted relative to one another, thus making it possible to suppress the peak values of the code-multiplexed signal, reduce the power of interference waves and raise the power efficiency of the transmitting power amplifier 56. In this case, the phases of the signal-point position vectors of the spread-spectrum modulated signals may be shifted by a prescribed angle with regard to all transmission data and pilot signals, or the phases of the position vectors of the spread-spectrum modulated signals may be shifted by a prescribed angle with regard solely to the pilot signals.

Further, in case of QPSK spread-spectrum modulation, the amount of phase shift is made 0, $\pi/2$, $\pi$ or $3\pi/2$. More specifically, if m=mod(i,4) holds (where m is the remainder obtained when i is divided by 4), then (m·$\pi/2$) is adopted as the amount of phase shift for the ith channel. If this arrangement is adopted, phase control can be carried out in simple fashion.

The receiver will not be able to demodulate the data correctly unless it is notified of the amount of phase shift. Accordingly, the receiver is notified of the amount of phase shift for each channel by a control channel or by a special-purpose channel dedicated to notification of amount of phase shift. Further, the data indicative of the above-mentioned amount of phase shift is inserted into the frames and these data are transmitted to the receiver along with the transmission data.

Further, in a case where the frame signal is alternately distributed one bit at a time to thereby be converted to I-component data and Q-component data, the I-component data and Q-component data are each spread-spectrum modulated by spreading codes, the spread-spectrum modulated signals of respective channels are multiplexed for every I component and Q component, the code-multiplexed signals of the I and Q components are quadrature modulated and then transmitted, the phase shifter is provided between the spread-spectrum modulator and code-multiplexed signal generator of each channel and the signal-point position vector in the I, Q rectangular coordinate system of the spread-spectrum modulated signal is shifted by a prescribed angle for each channel. In this case, the phase shifter makes the phase-shift angle $\theta$ of the ith channel equal to $360°·i/N$ and shifts the phase of the signal-point position vector by an amount equivalent to this phase-shift quantity $\theta$, where N represents the number of channels. Alternatively, if m=mod (i,4) holds (where m is the remainder obtained when i is divided by 4), then (m·$\pi/2$) is adopted as the amount of phase shift for the ith channel.

(B) First Embodiment

Figure 2:
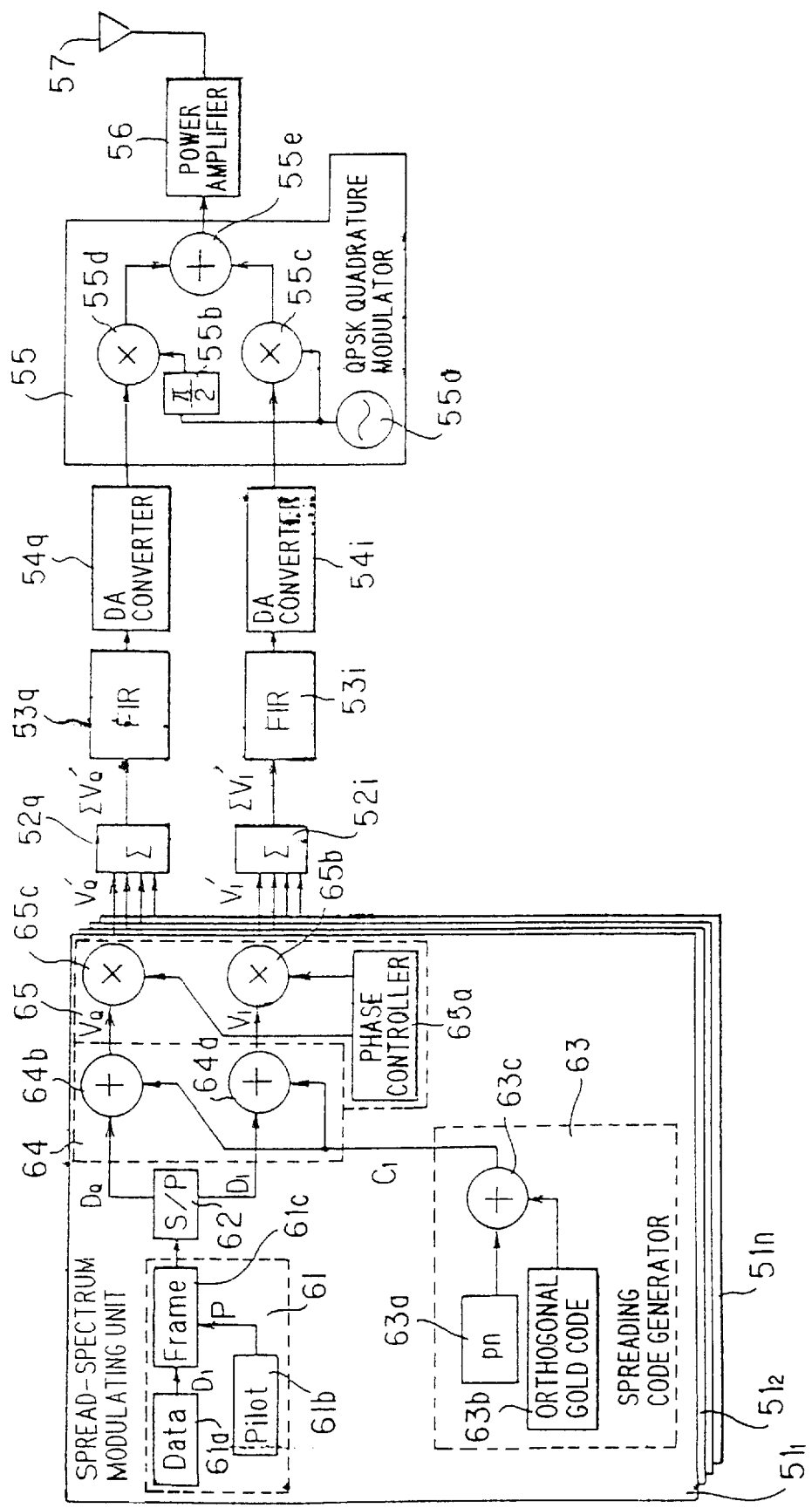
FIG. 2 is a diagram showing the construction of a code multiplexing transmitter according to first embodiment of the present invention.

FIG. 2 is a diagram showing the construction of a code multiplexing transmitter according to a first embodiment of the invention, e.g. a base station used in mobile wireless communication. This is an embodiment for a case where QPSK modulation is applied as ordinary narrow-band modulation.

As shown in FIG. 2, the spread-spectrum modulating units $51_1$~$51_n$ of the 1st~nth channels each include the frame generator 61 for generating a frame signal by inserting pilot signals into transmission data every predetermined number of items of data, a serial/parallel (S/P) converter 62 for converting the frame data to parallel data, the spreading code generator 63 for generating a spreading code $C_i$ (i=1, 2 . . . n), the spread-spectrum modulator circuit 64 for spread-spectrum modulating the frame signal by the spreading code $C_i$, and the phase shifter 65 for shifting, by a predetermined angle $\theta$ for every channel, the phase of a signal-point position vector of the spread-spectrum modulated signal.

The frame generator 61 includes a transmission data generator 61a for generating serial transmission data $D_i$ (i=1, 2, . . . n), a pilot signal generator 61b for generating a pilot signal P perpendicular to a base station, and a frame forming unit 61c for forming the serial data $D_i$ into blocks every predetermined number of bits and inserting the pilot signals at the beginning and end of each block to thereby form data frames. The frame generator 61 of each of the spread-spectrum modulating units $51_1$~$51_n$ inserts identical pilot signals P into the transmission data at identical timings.

The S/P converter 62 alternately distributes the frame data (the pilot signals and transmission data) one bit at a time to converter the frame data to I-component (in-phase component) data $D_I$ and Q-component (quadrature-component) data $D_Q$. The spreading-code generator 63 includes a pn sequence generator 63a for generating a pn sequence (long spreading code) specific to the base station, an orthogonal Gold code generator 63b for generating an orthogonal Gold code (short spreading code) for user identification, and an EX-OR gate 63c for obtaining the exclusive-OR between the pn sequence and the orthogonal Gold code and outputting the resulting code $C_i$(i=1, 2, . . . n). the spreading circuit 64 includes EX-OR gates 64a, 64b for performing spread-spectrum modulation by obtaining the exclusive-ORs between the I- and Q-component data $D_I$ and $D_Q$, respectively, and the code $C_1$. It should be noted that since "1" is level 1 and "Q" is level −1, the exclusive-OR between the signals is the same as the product between them.

Figure 3:
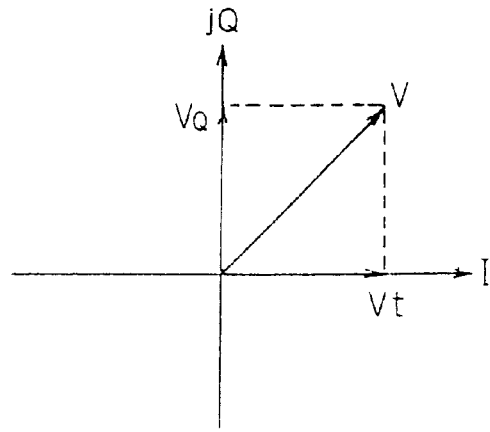
FIG. 3 is a diagram useful in describing the position vector of a spread-spectrum modulated signal.

The phase shifter 65 shifts the signal-point position vector of the spread-spectrum modulated signal by a prescribed angle $\theta$ for every channel. If the spread-spectrum modulated signals $V_I$, $V_Q$ of the I and Q components are plotted on a complex plane, the result is as shown in FIG. 3, where it is seen that the resultant vector V is the signal-point position vector of the spread-spectrum modulated signal.

Figure 4:
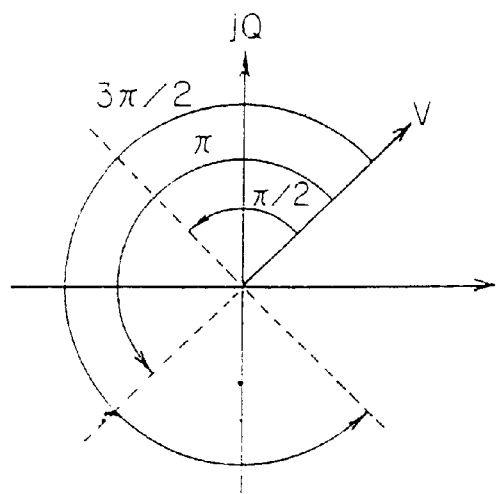
FIG. 4 is a diagram for describing amount of phase shift.

The peaks of the code-multiplexed signal occur at the portions where the spread pilot symbols are multiplexed. Accordingly, the signal-point position vector of the spread-spectrum modulated signal of each channel is angularly rotated (shifted) by 0, $\pi/2$, $\pi$ or $3\pi/2$, as shown in FIG. 4, to scatter the signal-point positions of the pilot signals of each channel. More specifically, the amount of phase shift $\theta$ of the ith channel among the N channels is obtained in accordance with the equation $$\theta = (\pi/2) \cdot \text{mod}(i,4) \tag{1}$$

and the signal-point position vector V of the spread-spectrum modulated signal is rotated by the amount of phase shift $\theta$, where mod(i,4) is the remainder obtained when i is divided by 4. In accordance with Equation (1), the amount of phase shift of the 0th channel is 0, the amount of phase shift of the first channel is $\pi/2$, the amount of phase shift of the second channel is $\pi$, the amount of phase shift of the third channel is $3\pi/2$, and so on.

The phase shifter 65 includes a phase controller 65a for calculating the amount of phase shift $\theta$ of the ith channel in accordance with the operation of Equation (1), and arithmetic units 65b, 65c for calculating, in accordance with Equations (2) and (3) below, I and Q components (symbols) $V_I'$, $V_Q'$ of a signal-point position vector V' resulting from rotation by $\theta$:

$$V_I'=V_I\cdot\cos\theta-V_Q\cdot\sin\theta \qquad (2)$$

$$V_Q'=V_I\cdot\cos\theta+V_Q\cdot\sin\theta \qquad (3)$$

Figure 5:
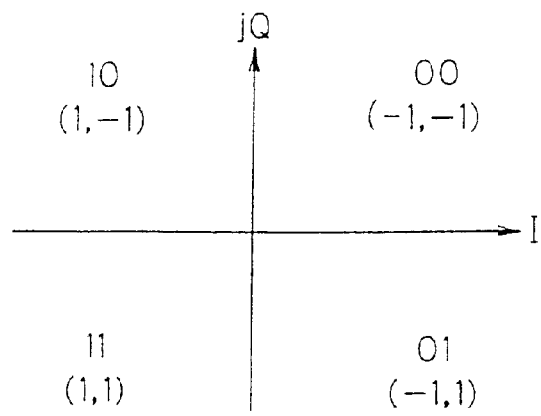
FIG. 5 is a diagram useful in describing symbol positions in quadrature phase-shift keying modulation.
Figures 6, 7:
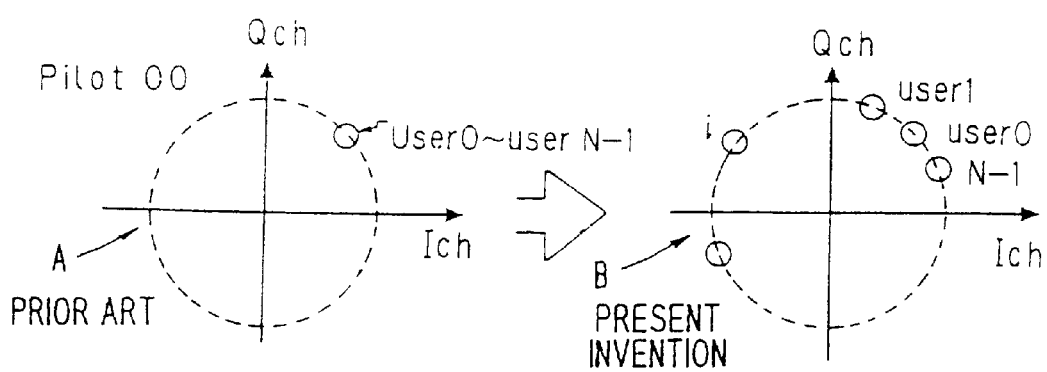
FIG. 6 is a diagram for describing symbol values ($V_I'$, $V_Q'$) after a phase shift.
FIG. 7 is a diagram useful in describing pilot symbol positions when amount of phase shift is made $2\pi \cdot i/N$.

If the operations of Equations (2) and (3) are performed by taking the symbol (00) in QPSK modulation in the first quadrant, the symbol (10) in the second quadrant, the symbol (11) in the third quadrant and the symbol (01) in the fourth quadrant and expressing "1" by the +1 level and "0" by the −1 level, as illustrated in FIG. 5, then the symbols ($V_I'$,$V_Q'$) upon rotation by the phase quantities 0, π/2, π and 3π/2 will be as shown in FIG. 6. The numerical values within the parentheses are the levels. Accordingly, a correspondence table shown in FIG. 6 giving the correspondence between the symbols ($V_I$,$V_Q$) before rotation and the symbols ($V_I'$,$V_Q'$) after rotation through each of the amounts of phase shift can be stored in memory beforehand. This will make it possible to obtain the phase-shifted I- and Q-components $V_I'$ and $V_Q'$ of the signal-point position vector V' from the correspondence table without performing the operations of Equations (2) and (3).

With reference again to FIG. 2, the combiner 52i outputs an I-component code-multiplexed signal $\Sigma V_I'$ by combining the I-component spread-spectrum modulated signals output by the respective spread-spectrum modulating units $51_1$~$51_n$, and a combiner 52q outputs a Q-component code-multiplexed signal $\Sigma V_Q'$ by combining the Q-component spread-spectrum modulated signals output by the respective spread-spectrums modulating units $51_1$~$51_n$. FIR-type digital chip shaping filters 53i, 53q limit the bandwidths of the code-multiplexed signals $\Sigma V_I'$, $\Sigma V_Q'$, respectively, and DA converters 54i, 54q convert the digital outputs of the respective filters 53i, 53q to analog signals. The quadrature modulating units 55 applies QPSK modulation to the code-multiplexed signals $\Sigma V_I'$, $\Sigma V_Q'$ of the I and Q components and outputs the modulated signal, a power amplifier 56 amplifies the output of the quadrature modulating unit 55 and an antenna 57 transmits the output of the amplifier.

The quadrature modulating unit 55 includes a carrier generator 55a for outputting a carrier wave cos ωt having a prescribed frequency, a 90° phase shifter 55b for shifting the phase of the carrier wave by 90° and outputting −sin ωt, a multiplier 55c for multiplying the output signal of the DA converter 54i by cos ωt, a multiplier 55d for multiplying the output signal of the DA converter 54q by −sin ωt, and a combiner 55e for combining the outputs of the multipliers 55c and 55d.

In accordance with the first embodiment, it is so arranged that the phase shifter 65 of each channel shifts the phase of the signal-point position vector of the spread-spectrum modulated signal by the angles 0, π/2, π, 3π/2 given by Equation (1). As a result, the pilot signal portion is split up into four portions. Consequently, the peak values at the pilot signal portions of the code-multiplexed signal can be reduced, the power of radio waves that interfere with other stations can be reduced and the capacity of the system can be increased. In addition, the fact that the peak values of the code-multiplexed signal can be made small makes it possible to enlarge the mean power of the input signal to the transmitting power amplifier 56, thereby making it possible to use the power amplifier efficiently.

The foregoing is for a case where the amounts of phase shift are made the angles θ, π/2, π and 3π/2, which are given by Equation (1), and the pilot signal portion of the code-multiplexed signal is dispersed into four portions. However, an arrangement can be adopted in which the pilot signal portion is split up into N(>4) portions to enhance the peak suppression effect. More specifically, it can be so arranged that the phase controller 65a of the phase shifter 65 calculates the amount of phase shift θ of an ith channel (ith user) in accordance with the equation $$\theta=360°\cdot i/N(i=0, 1, \ldots) \qquad (4)$$

(where N represents the number of channels) and the arithmetic units 65b, 65c execute the operations of Equations (2), (3) to rotate (shift the phase of) the signal-point position vector. If this arrangement is adopted the amounts of phase shift in each channel can be made to differ. As a result, the pilot signal portion of the code-multiplexed signal can be split up into N portions so that the peak values of the code-multiplexed signal at the pilot signal portion can be suppressed satisfactorily.

FIG. 7 is a diagram useful in describing pilot symbol positions of each channel in a case where the pilot symbol is 00. Here A is a diagram for describing pilot symbol position in a situation where conventional phase control is not carried out and B is a diagram for describing pilot symbol position of each channel in a case where phase shift by the angles given by Equation (4) is carried out in accordance with the present invention. With the conventional method, pilot symbol positions become superimposed and large peaks are produced at the pilot signal portions of the code-multiplexed signal. By contrast, with the method of the present invention, the pilot symbol positions do not become superimposed and, as a result, large peaks are not produced as the pilot signal portions.

(C) Second Embodiment

Figure 8:
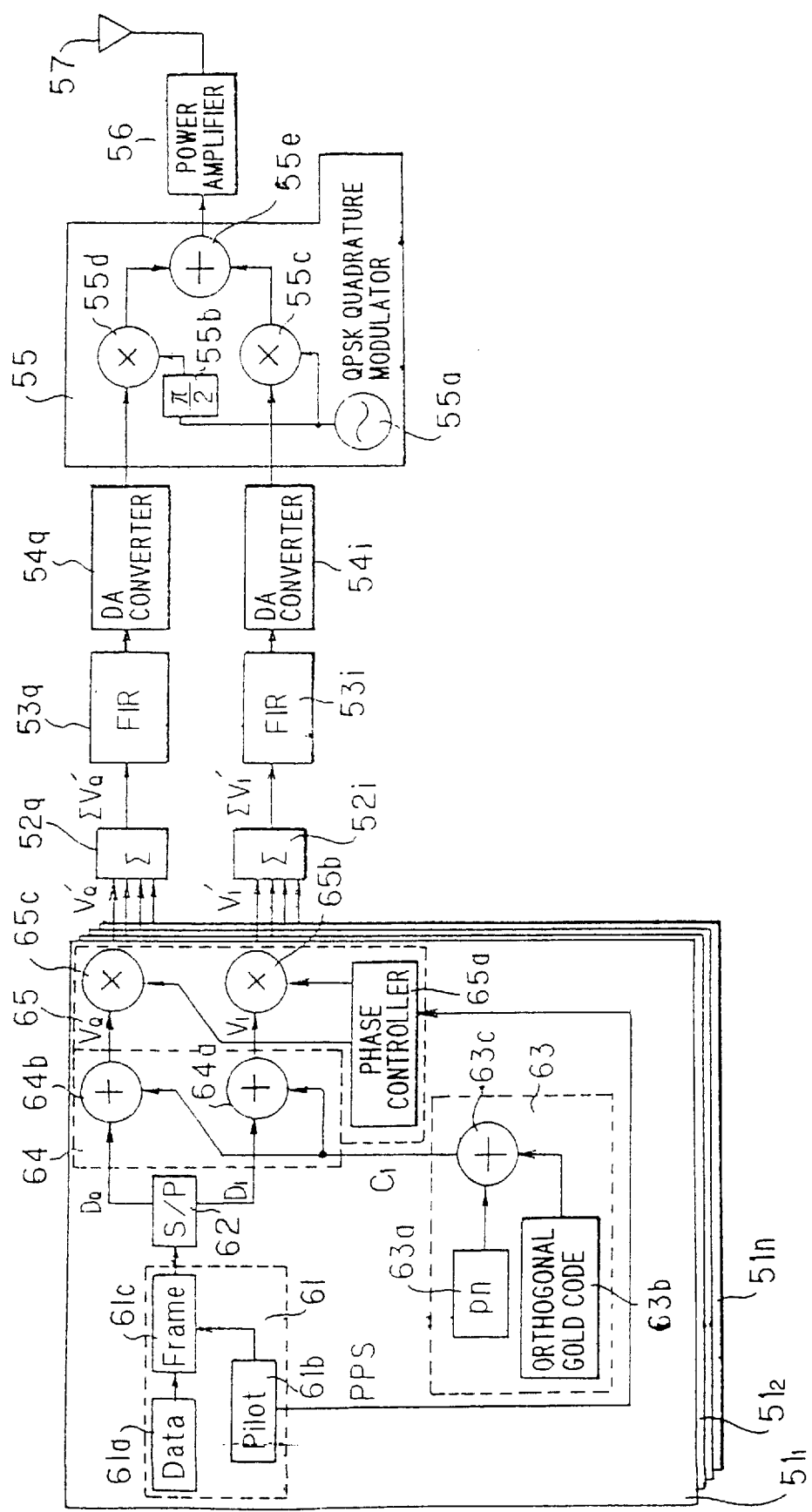
FIG. 8 is a diagram showing the construction of a code multiplexing transmitter according to a second embodiment of the present invention.

FIG. 8 is a diagram showing the construction of a code multiplexing transmitter according to a second embodiment of the invention. This is an embodiment for a case where QPSK modulation is applied as ordinary narrow-band modulation. Elements identical with those of the first embodiment shown in FIG. 2 are designated by like reference characters.

The first embodiment deals with a case in which the phase of the signal-point position vector of all transmission data and pilot signals in the code-multiplexed signal is rotated. In the second embodiment, only the signal-point position vector of the pilot signals is rotated.

The second embodiment of FIG. 8 differs from the first embodiment of FIG. 2 in that (1) a pilot position signal PPS indicating the pilot signal duration is input to the phase shifter 65 by the pilot generator 61b, and (2) the phase shifter 65 performs phase rotation control when the pilot position signal PPS is at the high level, thereby rotating the phase of the pilot symbol (the pilot signal-point vector) in accordance with Equations (1)~(3).

FIG. 9 is a diagram useful in describing a phase control value (amount of phase shift). FIG. 9 illustrates control of phase rotation through the angles 0, π/2, π, 3π/2, given by Equation (1), applied solely to the pilot signal portions of the spread-spectrum modulated signal. Phase angle is not controlled at the data portions.

The foregoing is for a case where the amounts of phase shift are made the angles θ, π/2, π, 3π/2 given by Equation (1), as a result of which the pilot signal portion is split up into four portions. However, the peak suppression effect can be enhanced further by splitting up the pilot signal portion into N portions. More specifically, it can be so arranged that the phase controller 65a of the phase shifter 65 calculates the amount of phase shift θ of an ith channel (ith user) in accordance with the Equation (4) (where N represents the number of channels) and the arithmetic units 65b, 65c execute the operations of Equations (2), (3) to rotate (shift the phase of) the signal-point position vector solely of the pilot signal portions of the spread-spectrum modulated signal.

Figures 10, 11:
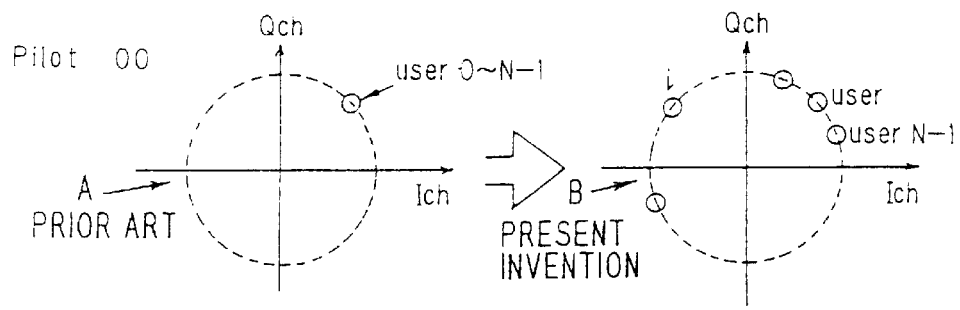
FIG. 10 is a diagram useful in describing a phase-shift control value (amount of phase shift)
FIG. 11 is a diagram useful in describing pilot symbol positions when amount of phase shift is made $2\pi \cdot i/N$.

FIG. 10 is a diagram useful in describing a phase control value (amount of phase shift). FIG. 10 illustrates control of phase rotation through the angles $\theta_0-\theta_{N-1}$ given by Equation (4), applied solely to the pilot signal portions of the spread-spectrum modulated signal. Phase angle is not controlled at the data portions.

FIG. 11 is a diagram useful in describing pilot symbol positions of each channel in a case where the pilot symbol is 00. Here A is a diagram for describing pilot symbol position in a situation where conventional phase control is not carried out and B is a diagram for describing pilot symbol position of each channel in a case where phase shift control by the angles given by Equation (4) is carried out in accordance with the present invention. With the conventional method, pilot symbol positions become superimposed and large peaks are produced at the pilot signal portions of the code-multiplexed signal. By contrast, with the method of the present invention, the pilot symbol positions do not become superimposed and, as a result, large peaks are not produced as the pilot signal portions.

If this arrangement is adopted the amounts of phase shift in each channel can be made to differ. As a result, the pilot signal portion of the code-multiplexed signal can be split up into N portions so that the peak values of the code-multiplexed signal at the pilot signal portions can be suppressed satisfactorily.

(D) Third Embodiment

In the first and second embodiments, amount of phase shift is calculated based upon Equation (1) or Equation (4). In the third embodiment, amounts of phase shift are brought into 1:1 correspondence with orthogonal Gold codes (short codes), the amount of phase shift that conforms to an orthogonal Gold code used in spread-spectrum modulation is obtained and the phase of the signal-point position vector is shifted by the amount of this phase shift.

Figure 12:
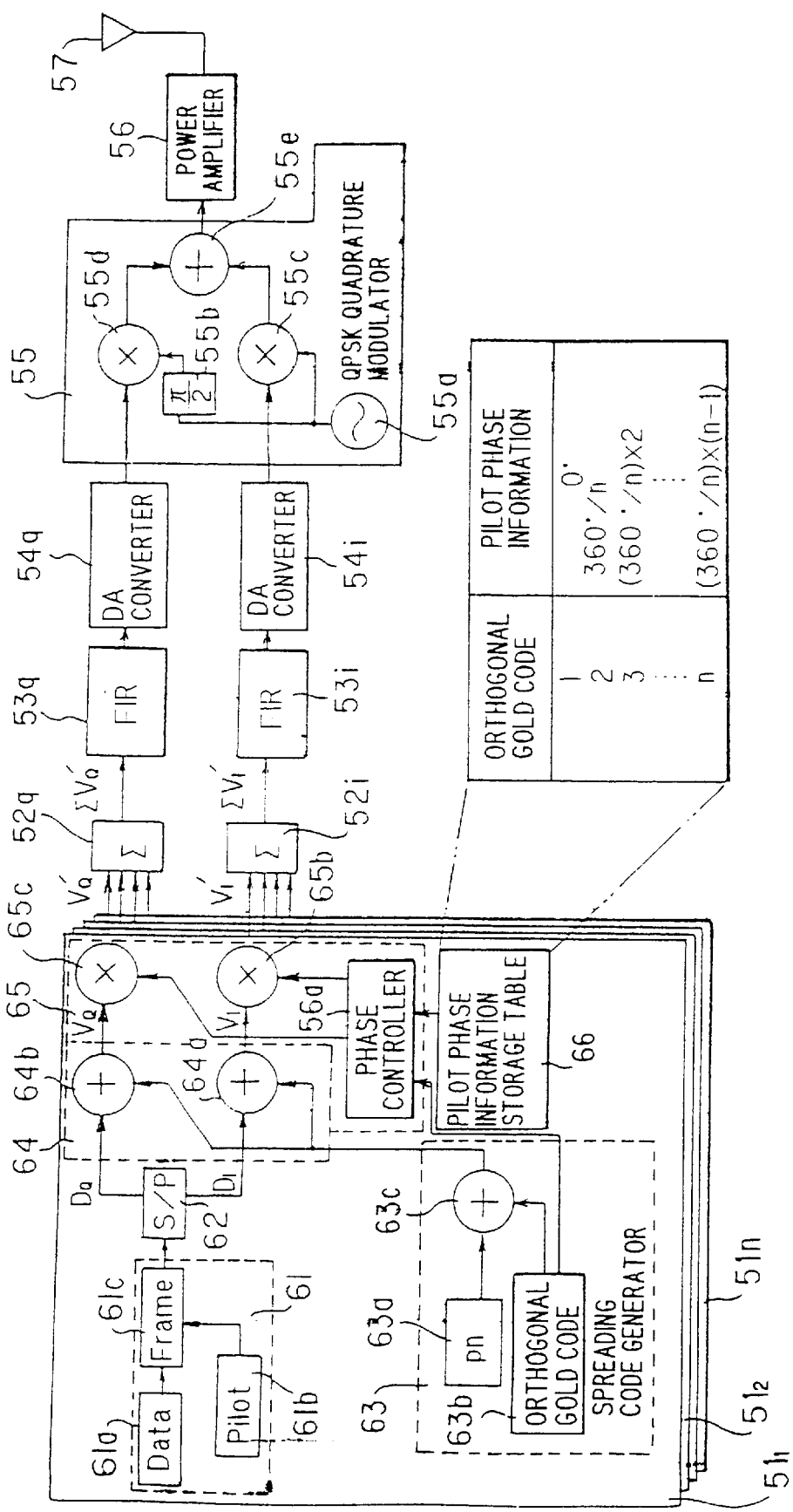
FIG. 12 is a diagram showing the construction of a code multiplexing transmitter according to third embodiment of the present invention.

FIG. 12 is a diagram showing the construction of a code multiplexing transmitter according to a third embodiment of the invention. Elements identical with those of the first embodiment shown in FIG. 2 are designated by like reference characters. The third embodiment of FIG. 12 differs from the first embodiment of FIG. 2 in that (1) a pilot phase information storage table 66 is provided and stores the correspondence between orthogonal Gold code identification numbers and amounts $\theta$ of pilot phase shift, and (2) the phase shifter 65 obtains, from the correspondence table, the amount of phase shift that corresponds to an orthogonal Gold code used in spread-spectrum modulation and controls the rotation of the signal-point position vector by this amount of phase shift.

The amount of phase shift $\theta$ corresponding to an ith orthogonal Gold code is given by the following equation:

$$\theta=(i-1)\cdot 2\pi/M \qquad (5)$$

where M represents the number of orthogonal Gold codes. Accordingly, it is also possible to adopt an arrangement in which the phase controller 65a is capable of deciding the amount of phase shift $\theta$ by performing the operation of Equation (5) without using a table.

In accordance with the third embodiment, the amount of phase shift is decided in dependence upon the orthogonal Gold code for user identification. This means that the user need only be notified of the orthogonal Gold code, it being unnecessary to separately notify the user of the amount of phase shift. This makes it possible to eliminate control for notifying of amount of phase shift.

(E) Fourth Embodiment

In a case where the signal-point position vector has been rotated (the symbol position has been phase-shifted) on the side of the transmitter, the pilot cannot be detected accurately and precise data reconstruction cannot be carried out on the receiver side unless the receiver is made to recognize the amount of phase shift. Accordingly, the fourth embodiment is so adapted that the receiver can be notified of the amount of phase shift.

Figure 13:
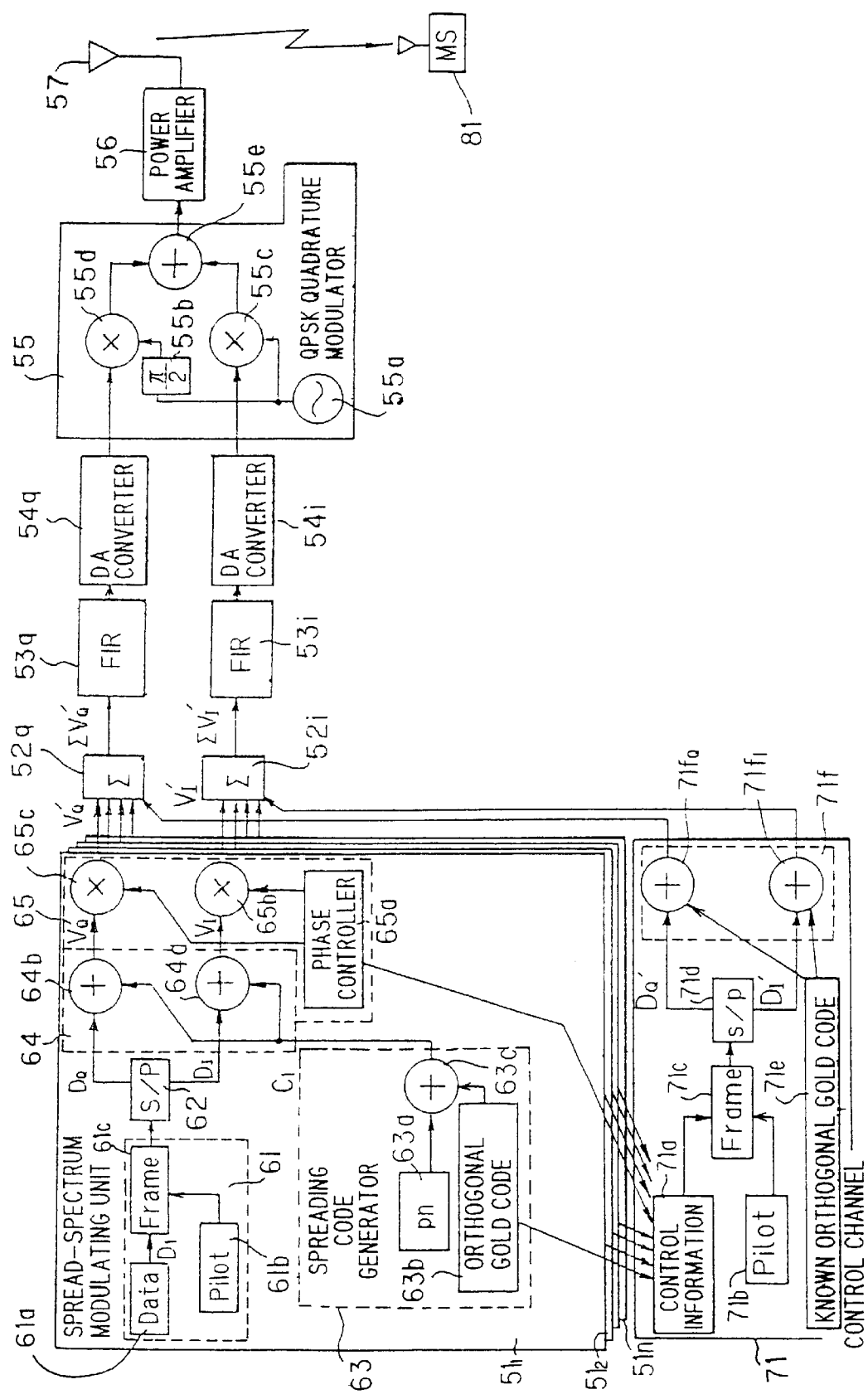
FIG. 13 is a diagram showing the construction of a code multiplexing transmitter according to fourth embodiment of the present invention.

FIG. 13 is a diagram showing the construction of a code multiplexing transmitter according to a fourth embodiment of the invention having means for giving notification of amount of phase shift. Elements identical with those of the first embodiment shown in FIG. 2 are designated by like reference characters. This transmitter includes a spread-spectrum modulating unit 71 for the control channel. A mobile station (MS) is shown at 81.

The spread-spectrum modulating unit 71 for the control channel includes a control information generator 71a, a pilot generator 71b, a frame forming unit 71c, an S/P converter 71d, an orthogonal Gold code generator 71e for generating a known orthogonal Gold code for the control channel, and a spreading circuit 71f. The control information generator 71a acquires and generates control information such as (1) a number specifying an orthogonal Gold code used in each channel (by each user) and (2) the amount of phase shift $\theta$ in each channel. The frame forming unit 71c forms the control data into blocks every predetermined number of bits and inserts the pilot signals P at the beginning and end of each block to thereby form data frames. The S/P converter 71d alternately distributes the frame data (the pilot signals and control data) one bit at a time to convert the frame data to I-component (in-phase component) data $D_I'$ and Q-component (quadrature-component) data $D_Q'$. Exclusive-OR gates $71f_I$, $71f_Q$ of the spreading circuit 71f perform spread-spectrum modulation by obtaining the exclusive-ORs between the I- and Q-component data $D_I'$ and $D_Q'$, respectively, and the orthogonal Gold code.

In accordance with the fourth embodiment, one channel is used as a control channel and control information such as an orthogonal Gold code identification number for user identification and the amount of phase shift $\theta$ in each user channel is transmitted to the receiver side using the control channel.

Since the orthogonal Gold code used in the control channel and the pilot signals inserted in the frames are already known in the mobile station (on the terminal side) 81, the mobile station detects the pilots using the known orthogonal Gold code, obtains the amount of phase rotation $\theta$ in the transmission path of the spread-spectrum modulated signal of th control channel and then subsequently performs de-spreading by restoring, by the amount obtained ($=\theta$), the phase of the modulated received spread-spectrum modulated signal, thereby demoduling the data. As a result, the mobile station 81 is capable of obtaining the orthogonal Gold code identification number for user identification and the phase rotation information (the amount of phase shift $\theta_i$) from the control channel.

The mobile station 81 thenceforth applies QPSK demodulation processing to the code-multiplexed signal sent from the base station, restores the I and Q components (the signal-point position vector) of the demodulated spread-spectrum modulated signal to the original by rotating these components in the opposite direction by the amount of phase shift $\theta_i$ of which notification has been given via the control channel, and demodulates the pilot signals and transmission data by performing de-spreading.

In a case where phase rotation solely of the pilot signal portion is performed on the transmitting side, as in the second embodiment, only the signal-point position vector of the pilot signal portion is restored by being rotated on the receiving in the opposite direction by the amount of phase shift of which notification has been given, and the pilot signals and transmission data are demodulated by performing de-spreading.

An alternative method of transmitting the phase information to the side of the mobile station is to prepare a special-purpose channel, which is separate from the control channel, for notification of phase information and give notification of the phase information via this channel.

(F) Fifth Embodiment

In the fourth embodiment, the receiver is notified of the amount of phase shift via a control channel or special-purpose channel for giving notification of the phase information. In a fifth embodiment, the mobile station is notified of phase information by a frequency different from that of the code-multiplexed signal.

Figure 14:
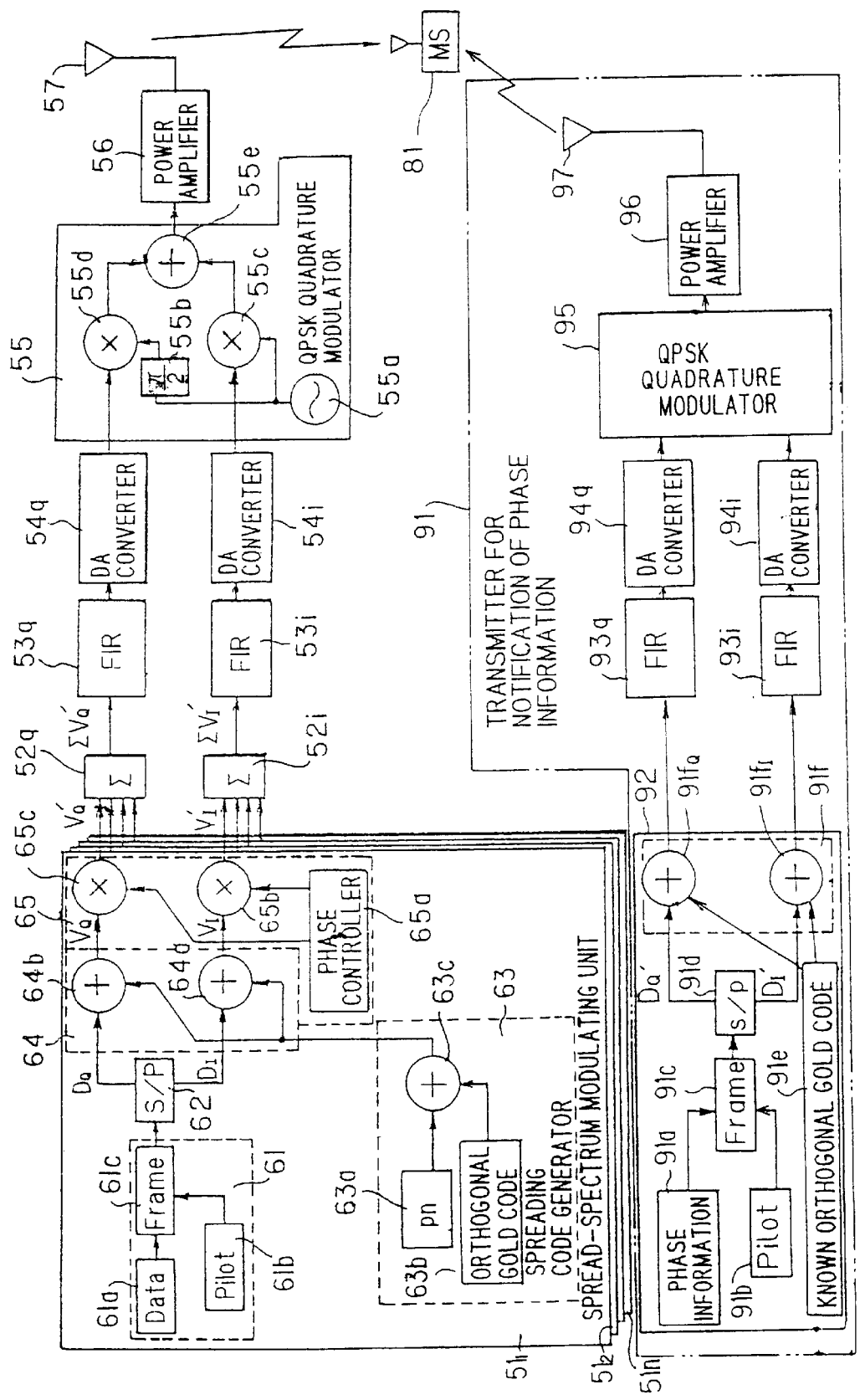
FIG. 14 is a diagram showing the construction of a code multiplexing transmitter according to fifth embodiment of the present invention.

FIG. 14 is a diagram showing the construction of the fifth embodiment, in which elements identical with those of the first embodiment in FIG. 2 are designated by like reference characters.

The transmitter includes a transmitter 91 for giving notification of phase information. The mobile station (MS) is shown at 81.

The transmitter 91 for notification of phase information includes a spread-spectrum modulating unit 92, chip shaping filters 93$i$, 93$q$, DA converters 94$i$, 94$q$, a QPSK quadrature modulator 95 for performing quadrature modulation using frequencies cos $\omega_1 t$, sin $\omega_1 t$ different from the frequencies of the quadrature modulator 55, a transmitting power amplifier 96 and an antenna 97. The spread-spectrum modulating unit 92 includes a phase information generator 91$a$, a pilot generator 91$b$, a frame forming unit 91$c$, an S/P converter 91$d$, an orthogonal Gold code generator 91$e$ for generating a known orthogonal Gold code, and a spreading circuit 91$f$. The phase information generator 91$a$ acquires amount of phase shift $\theta_i$ in each channel (of each user) and generates phase information. The frame forming unit 91$c$ forms the phase data into blocks every predetermined number of bits and inserts the pilot signals P at the beginning and end of each block to thereby form data frames. The S/P converter 91$d$ alternately distributes the frame data (the pilot signals and phase information) one bit at a time to convert the frame data to I-component (in-phase component) data $D_I'$ and Q-component (quadrature-component) data $D_Q'$. Exclusive-OR gates 91$f_I$, 91$f_Q$ of the spreading circuit 91$f$ perform spread-spectrum modulation by obtaining the exclusive-ORs between the I- and Q-component data $D_I'$ and $D_Q'$, respectively, and the orthogonal Gold code.

Since the frequency for notification of phase information, the orthogonal Gold code used in notification of the phase information and the pilot signals inserted in the frames are already known in the mobile station (on the terminal side) 81, the mobile station obtains the phase information (amount of phase shift) from the already known phase-information notification frequency. The mobile station 81 thenceforth switches over the reception band to the code-multiplexed signal bandwidth, applies QPSK demodulation processing to the code-multiplexed signal sent from the base station, restores the I and Q components (the signal-point position vector) of the demodulated spread-spectrum modulated signal to the original by rotating them in the opposite direction by the amount of phase shift obtained above, and demodulates the pilot signals and transmission data by performing de-spreading.

(G) Sixth Embodiment

In the fourth embodiment the receiver is informed of the amount of phase shift via control channel or special-purpose channel dedicated to giving notification of the phase information. In a sixth embodiment, however, the phase information (amount of phase shift) of each channel is inserted in a frame and transmitted together with the pilot signals and transmission data.

Figure 15:
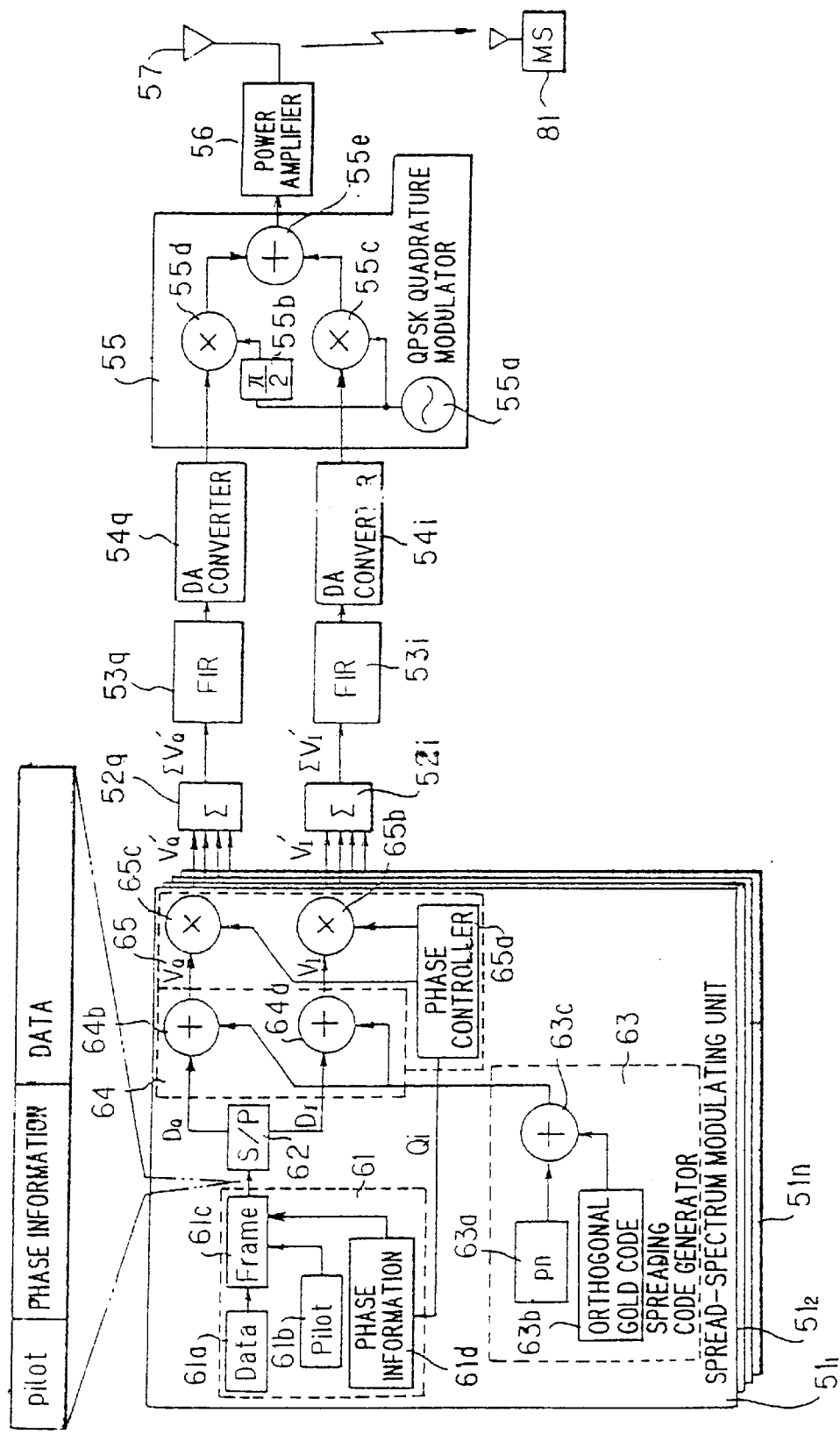
FIG. 15 is a diagram showing the construction of a code multiplexing transmitter according to sixth embodiment of the present invention.
Figure 16:
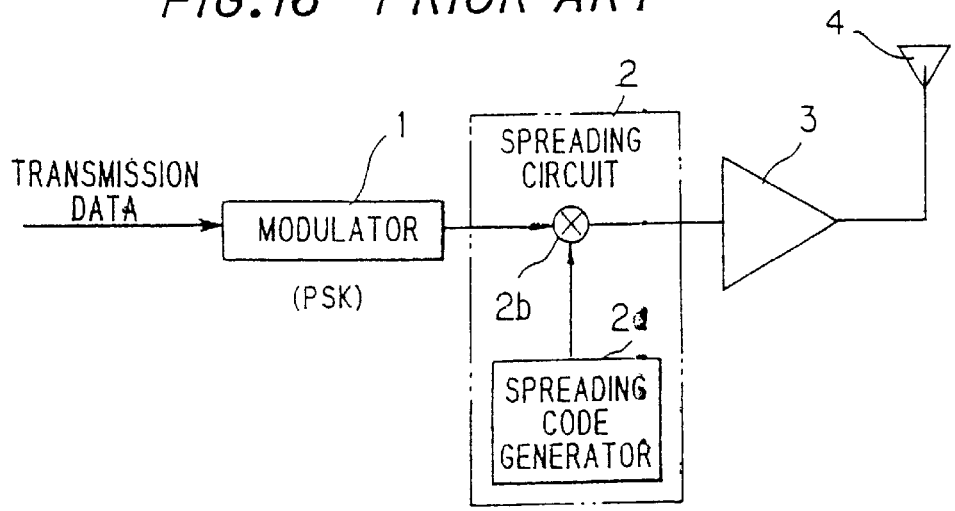
FIG. 16 is a block diagram illustrating the principle of a transmitter.
Figure 17:
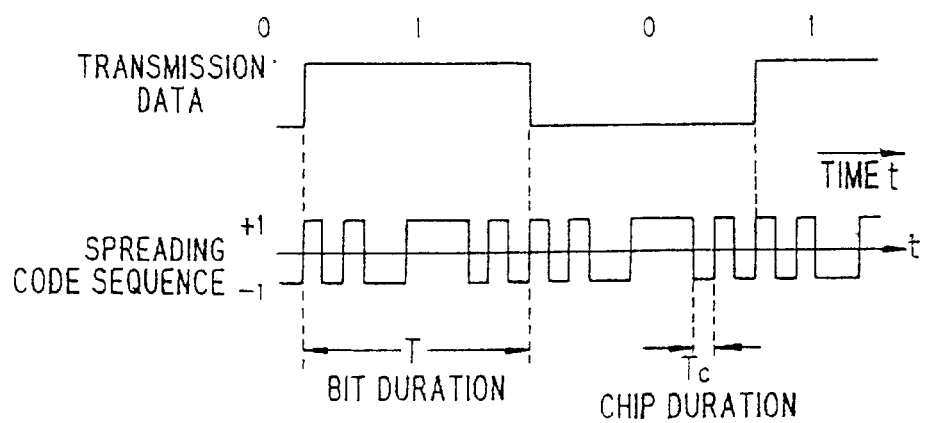
FIG. 17 is a diagram useful in describing the temporal waveforms of transmission data and a spreading code sequence.
Figure 18:
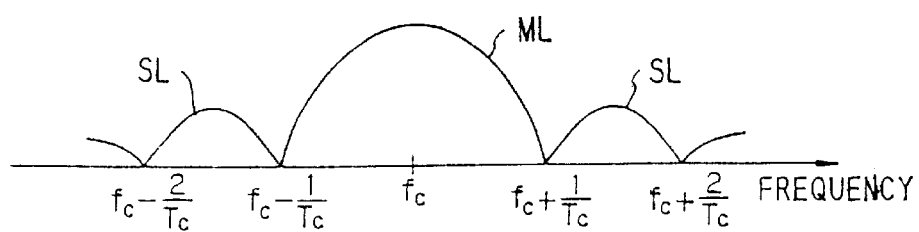
FIG. 18 is a diagram useful in describing the spectrum distribution of a spread-spectrum modulated signal.
Figure 19:
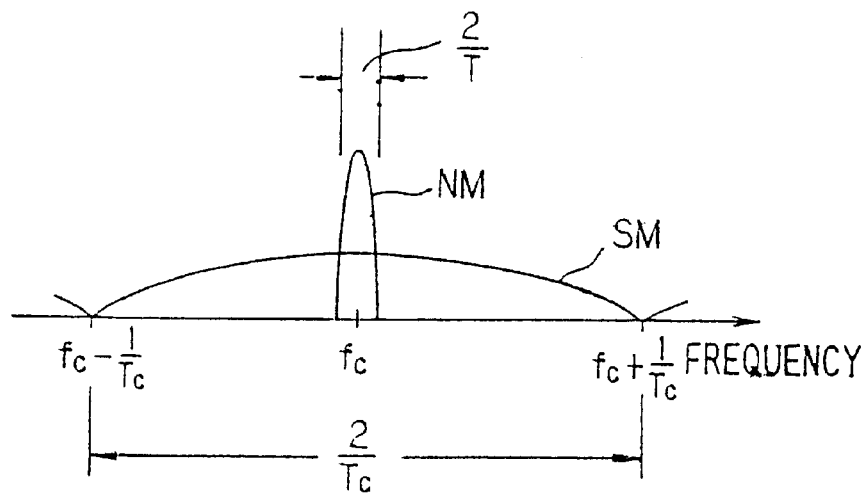
FIG. 19 is a diagram for describing spreading ratio.
Figure 20:
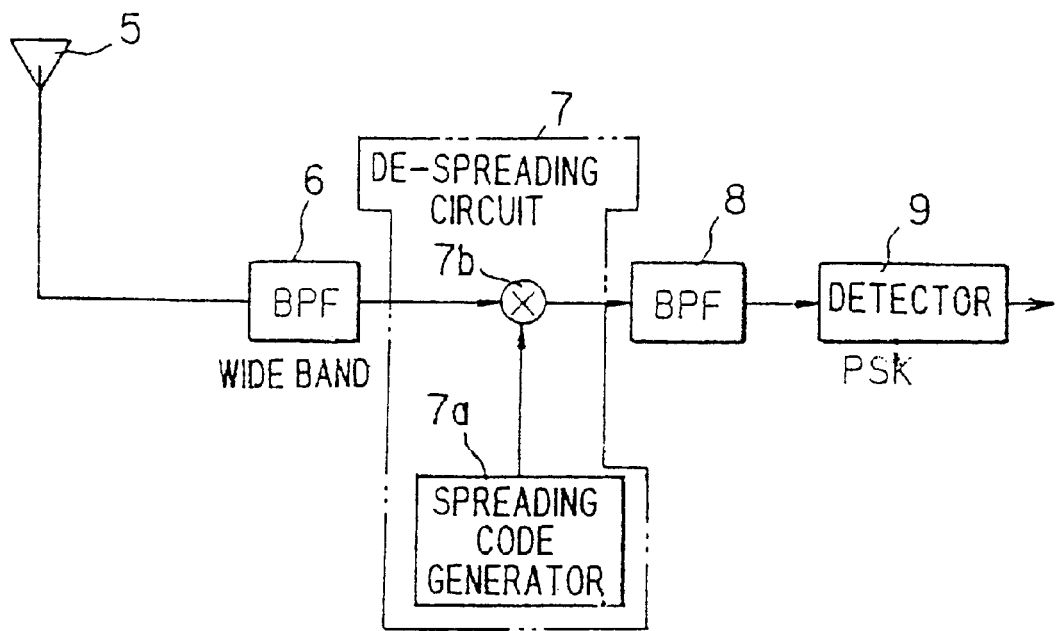
FIG. 20 is a diagram showing the principle of a receiver.
Figure 21:
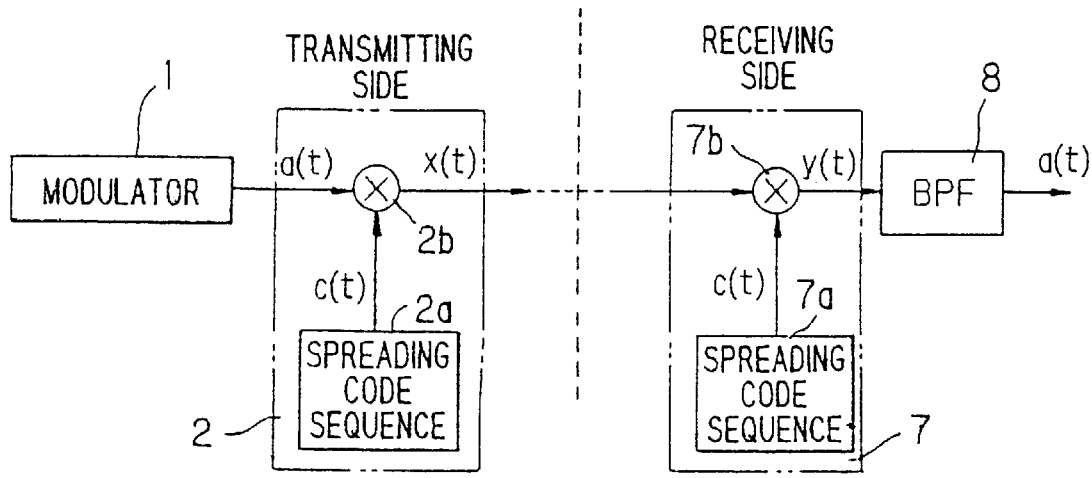
FIG. 21 is a diagram for describing de-spreading.
Figure 22:
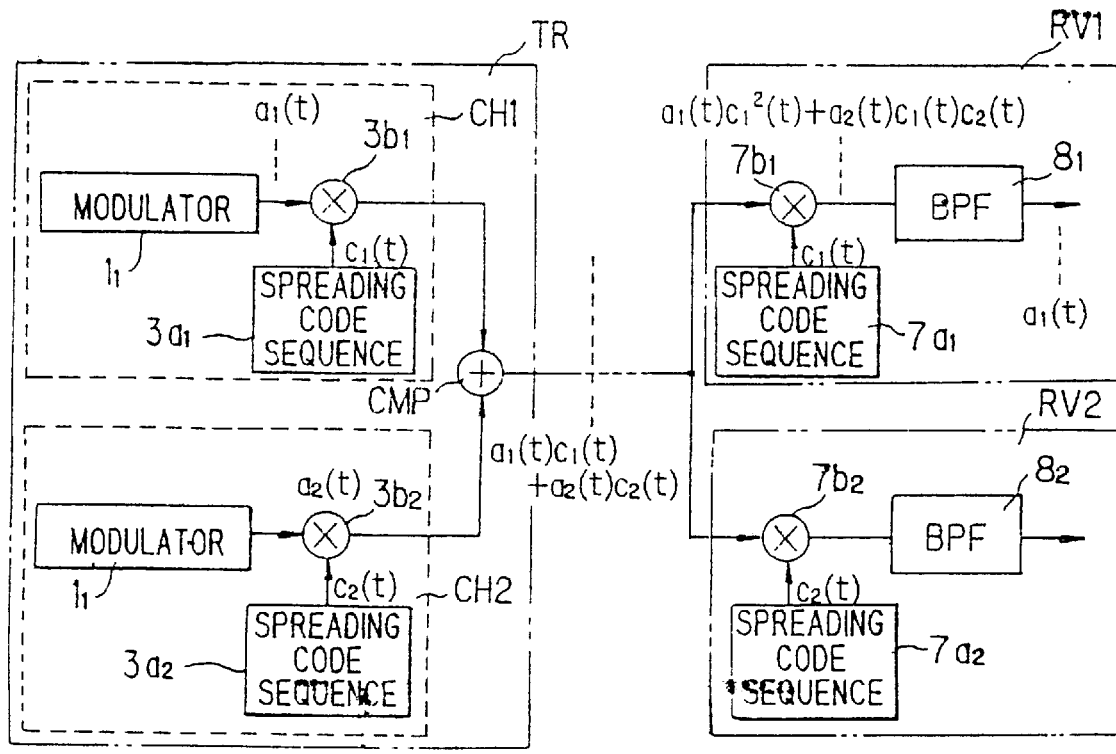
FIG. 22 is a diagram for describing the principle of CDMA.
Figure 23:
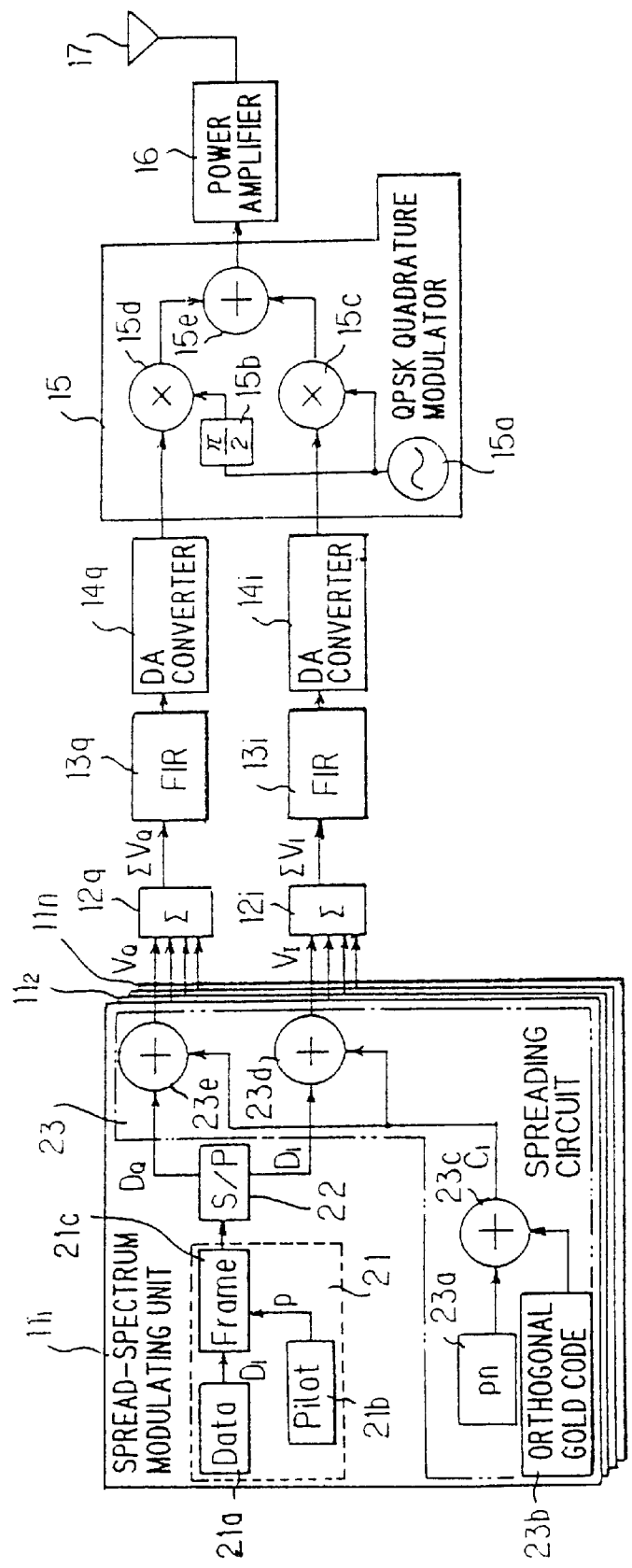
FIG. 23 is a diagram showing the construction of a prior art CDMA transmitter.
Figure 24:
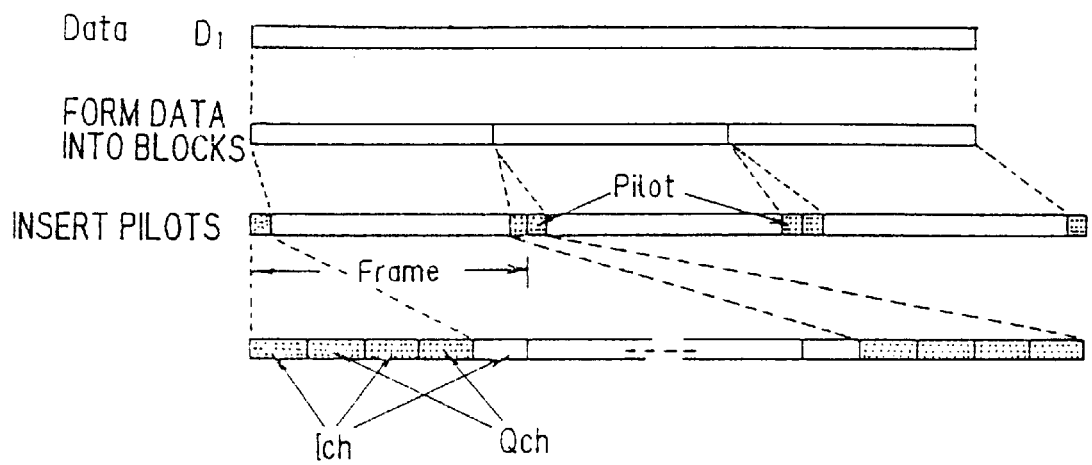
FIG. 24 is a diagram for describing frames.
Figure 25:
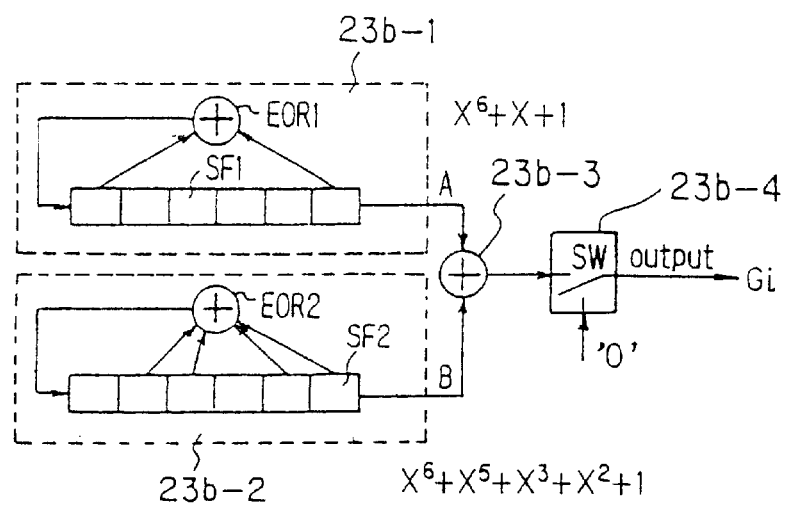
FIG. 25 is a diagram showing the construction of an orthogonal Gold code generating circuit.
Figure 27:
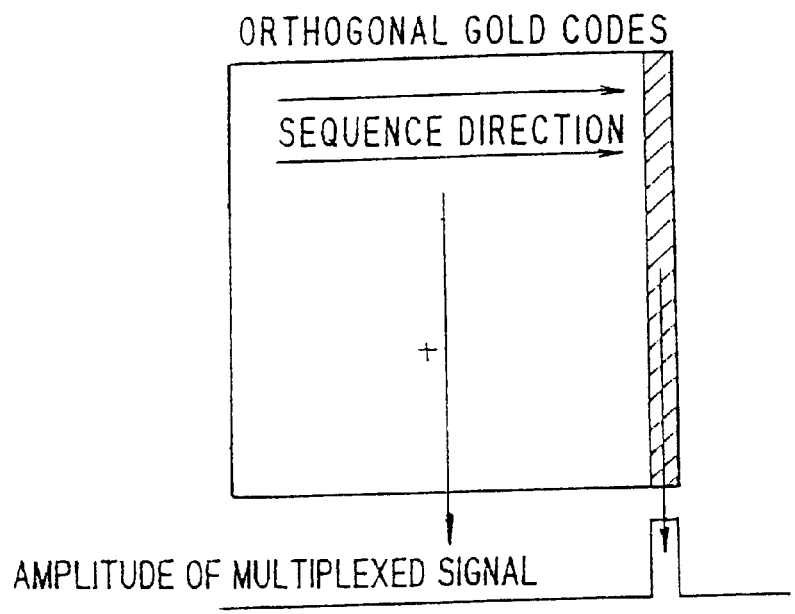
FIG. 27 is a diagram for describing amplitude when orthogonal codes are multiplexed.
Figure 28:
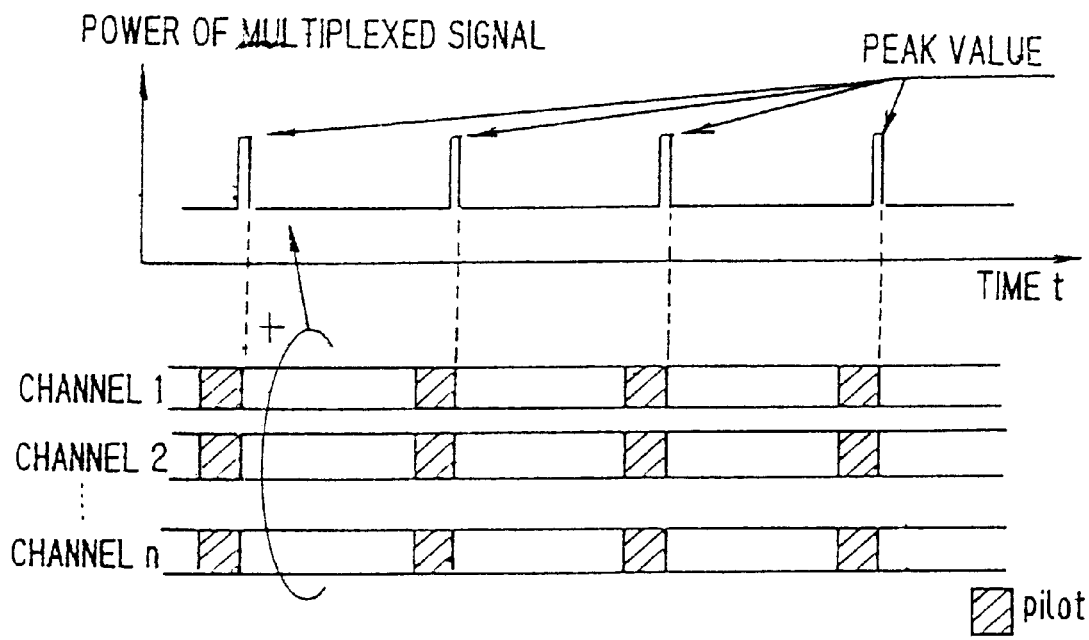
FIG. 28 is a diagram useful in describing the output power of a multiplexed signal when a prior-art method is used.
Figure 29:
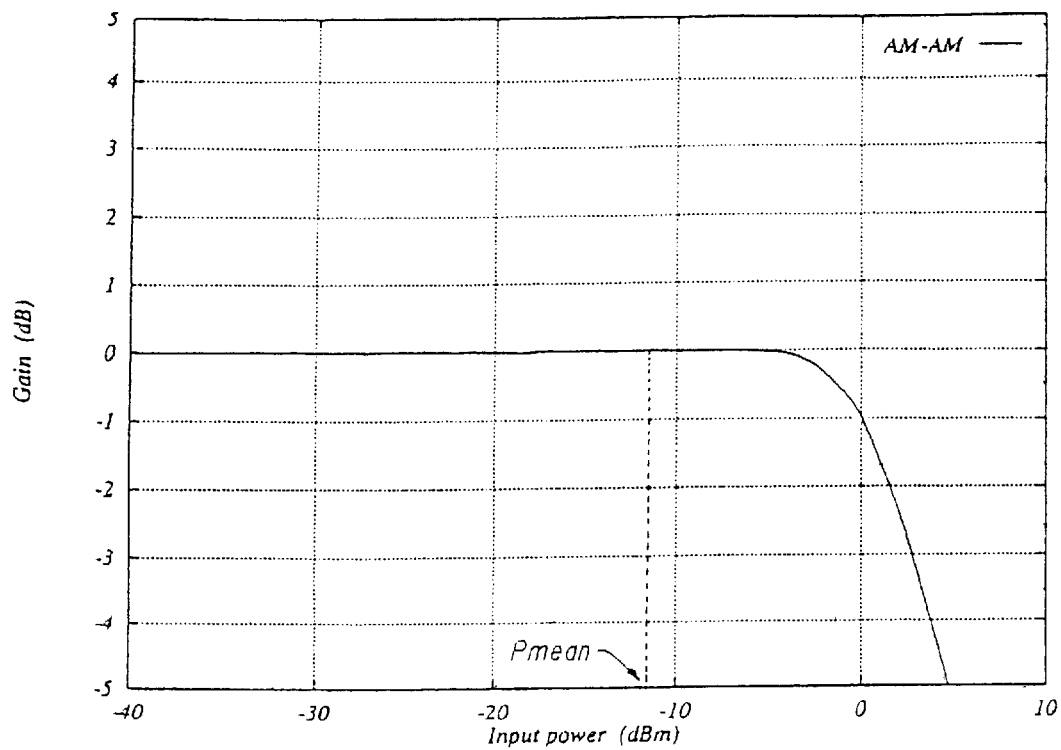
FIG. 29 is characteristic diagram showing the AM-AM characteristic of an amplifier.
Figure 30:
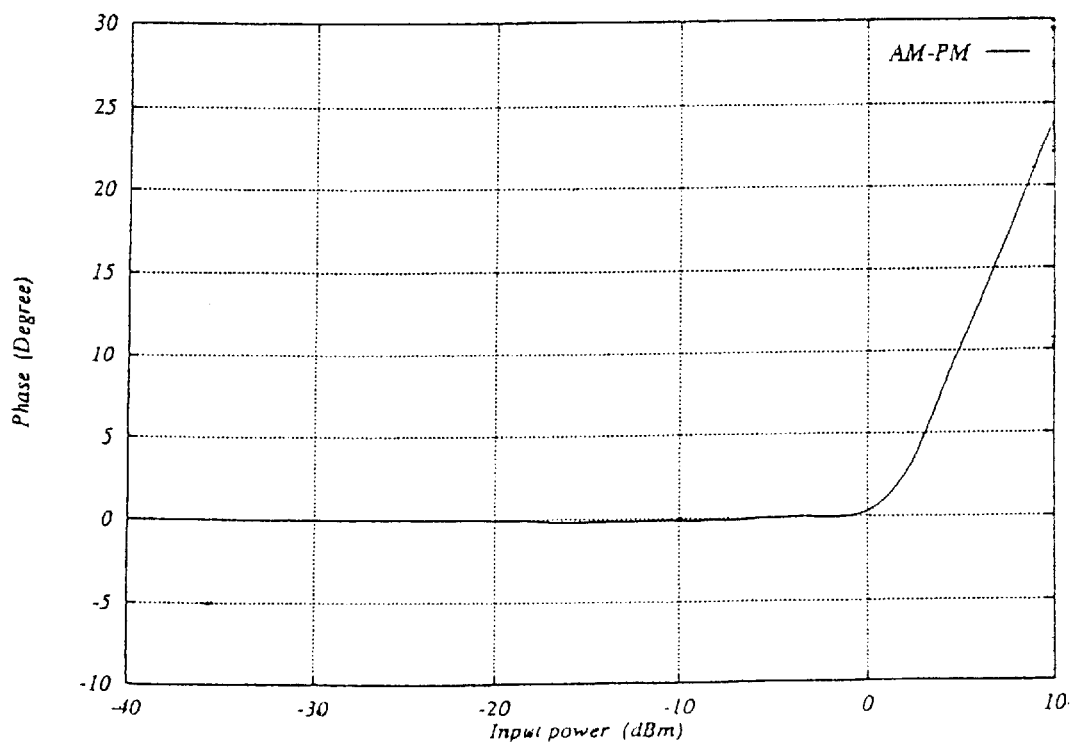
FIG. 30 is characteristic diagram showing the AM-PM characteristic of the amplifier.
Figure 31:
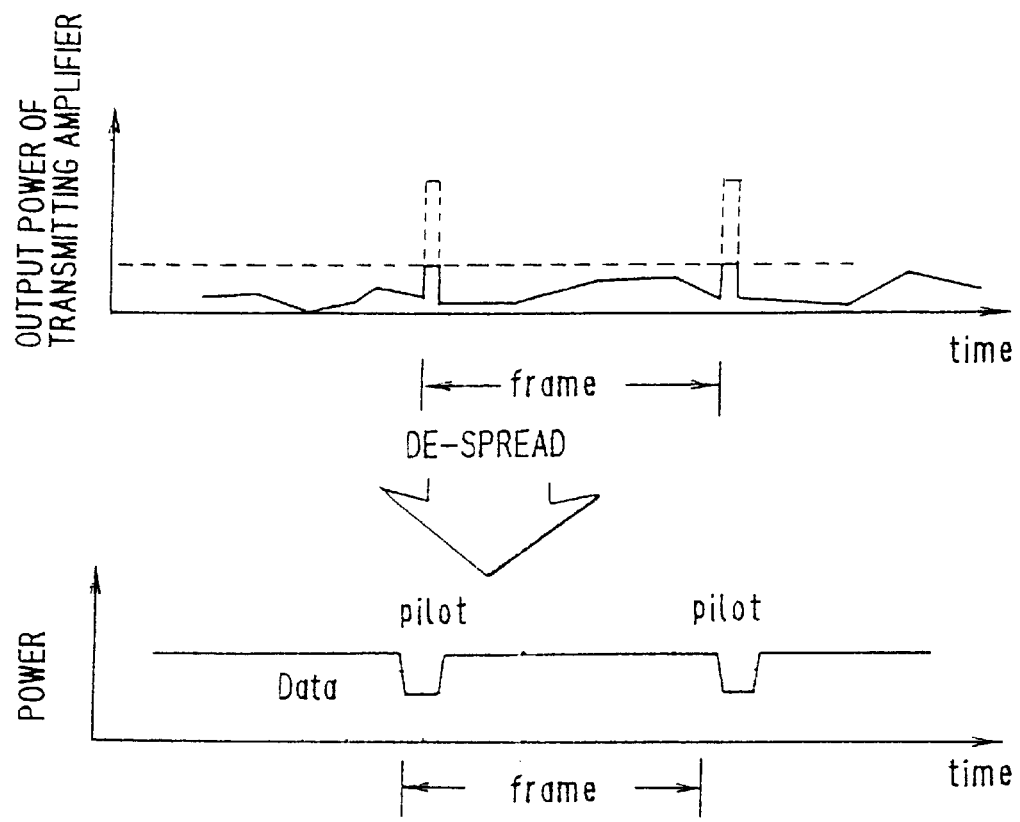
FIG. 31 is a diagram for describing the output power of a transmitting amplifier and transmission power after de-spreading.

FIG. 15 is a diagram showing the construction of the sixth embodiment, in which elements identical with those of the first embodiment in FIG. 2 are designated by like reference characters. This embodiment differs from the first embodiment in that (1) a phase information generator 61$d$ is provided in the frame generator 61;

(2) the amount of phase shift $\theta_i$ is input to the phase information generator 61$d$ from the phase shifter 65; and (3) the frame forming unit 61$c$ forms frames by forming the serial transmission data into blocks every predetermined number of bits, inserting the pilot signals at the beginning and end of each block and inserting the phase information after the pilot signals.

Initially the base station transmits the signal-point position vector of the spread-spectrum modulated signal without rotating the vector (without performing phase control). The mobile station 81 establishes synchronization between the base station and the mobile station, subsequently detects the phase information (amount of phase shift $\theta_i$) within the frame and rotates the I and Q components (the signal-point position vector) of the demodulated spread-spectrum modulated signal in the opposite direction by the amount of the phase shift $\theta_i$ detected. On the other hand, the phase shifter 65 of the base station rotates the signal-point position vector of the spread-spectrum signal by the amount of phase shift $\theta_i$ by suitably selecting the timing at which the mobile station detected the amount of phase shift $\theta_i$, and the quadrature modulating unit 55 subjects the code-multiplexed signal to QPSK modulation and then transmits the modulated signal. As a result, the mobile station subsequently is capable of restoring the I and Q components (the signal-point position vector) of the demodulated spread-spectrum modulated signal to the original by rotating them in the opposite direction by the amount of phase shift $\theta_i$ detected, and of demodulating the pilot signals and transmission data by performed de-spreading.

In accordance with the sixth embodiment, phase control is not carried out until the phase information is detected. After the phase information is detected, however, phase control is performed so that the peaks of the code-multiplexed signal can be suppressed.

In accordance with the present invention, it is so arranged that the phase of the signal-point position vector of a spread-spectrum modulated signal is shifted by a prescribed angle every channel. As a result, even if identical pilots are generated by the frame generator of each channel at identical timings, the phases of the pilot signal portions of the spread-spectrum modulated signals output by the spread-spectrum modulators of the respective channels will be staggered and dispersed relative to one another, thus making it possible to suppress the peak values of the code-multiplexed signal, reduce the power of interference waves and raise the power efficiency of the transmitting power amplifier.

Further, in accordance with the present invention, the amounts of phase shift are made 0, $\pi/2$, $\pi$ and $3\pi/2$ in case of QPSK spread-spectrum modulation. As a result, control of phase can be carried out in simple fashion.

Further, in accordance with the present invention, the amount of phase shift in each channel can be made different by making the amount of phase shift $\theta_i$ of the ith channel equal to $i \cdot 2\pi/N$. This makes it possible to disperse the pilot signal portions of the code-multiplexed signal so that the amount of suppression of peak values can be enlarged.

Further, in accordance with the present invention, it is so arranged that the receiver side is notified of the amount of phase shift of each channel by a control channel or by a special-purpose channel dedicated to giving notification of the amount of phase shift. As a result, the receiver is capable of demodulating pilot symbols and data symbols correctly.

Further, in accordance with the present invention, it is so arranged that data giving notification of the amount of phase shift is inserted into frames and transmitted to the receiver side together with the transmission data. As a result, the receiver side can be notified of the data representing the amount of phase shift through simple control.

Further, in accordance with the present invention, amounts of phase shift are brought into 1:1 correspondence with spreading codes (orthogonal Gold codes) beforehand and a phase shifter obtains the amount of phase shift that conforms to an orthogonal Gold code used in spread-spectrum modulation and rotates the phase of the signal-point position vector by the amount of this phase shift. As a result, the amount of phase shift can be decided in simple fashion. Moreover, the receiver side need only be notified of the originally required spreading code (orthogonal Gold code) used in de-spreading and it is unnecessary to inform of amount of phase shift separately. As a result, control for giving notification of amount of phase shift can be eliminated, thereby simplifying control.

As many widely different embodiments of the present invention can be made without departing from the spirit and scope thereof, it is to be understood that the invention is not limited to the specific embodiments thereof except as defined in the appended claims.

What is claimed is:

1. A base station of a spread-spectrum wireless communication system, comprising:
    a spread-spectrum modulating unit for spreading a data signal; and
    a phase shift unit for shifting the phase of the spread-spectrum modulated data signal, wherein said phase shift unit shifts the phase by a predetermined value.

2. A base station of a spread-spectrum wireless communication system, comprising:
    a spread-spectrum modulating unit for spreading a data signal;
    a phase shift unit for shifting the phase of the spread-spectrum modulated data signal; and
    a phase controller unit that controls the amount of phase shift by selecting a phase shift value from a predetermined set of phase shift values.

3. A base station of a spread-spectrum wireless communication system, comprising:
    a spread-spectrum modulating unit for spreading a data signal; and
    a phase shift unit for shifting the phase of the spread-spectrum modulated data signal, wherein said data signal includes a pilot signal.

4. The base station of claim 2, further comprising:
    a storage unit for storing a table of a correspondence between a spreading code for each channel and an amount of phase shift value; wherein
    said phase controller unit controls the phase shifting of a signal-point position vector by obtaining from the table, a phase shift value associated with a corresponding spreading code.

5. A spread-spectrum wireless communication system operating on multiple user channels, comprising:
    a spreading unit for spreading transmission data with a spreading code and providing spread-spectrum modulated transmission data;
    a phase controller for providing a phase factor for each of said multiple user channels; and
    a phase shifter, provided for each of said multiple user channels, for shifting the phase of said spread-spectrum modulated transmission data by said phase factor for the respective user channel.

6. The spread-spectrum wireless communication system of claim 5, wherein said phase shifter shifts the phase by a predetermined value.

7. The spread-spectrum wireless communication system of claim 5, wherein said spread-spectrum modulated data contains a pilot signal.

8. The spread-spectrum wireless communication system of claim 5, further comprising:
    a storage unit for storing a table of a correspondence between each spreading code and an amount of phase shift value; wherein
    said phase controller controls the phase shifting of a signal-point position vector by obtaining from the table, a phase shift value associated with the corresponding spreading code.

9. The spread-spectrum wireless communication system of claim 5, further comprising:
    a terminal device for receiving said shifted spread-spectrum modulated data.

10. A spread-spectrum wireless communication system including a base station and a mobile station comprising:
    a plurality of spread-spectrum modulating units which modulate input data signals each of said plurality of spread-spectrum modulating units having a spreading part for modulating said input data signals with a spreading code resulting in a spread-spectrum modulated signal and a phase shifter which shifts the phase of said spread-spectrum modulated signal; and
    a receiver which receives said data signal which is spread-spectrum modulated and phase shifted.

11. A spread-spectrum wireless communication system of claim 10, wherein said base station includes said plurality of spread-spectrum modulating units.

12. A spread-spectrum wireless communication system of claim 10, wherein said mobile station includes said receiver.

13. A spread-spectrum modulating apparatus in a spread-spectrum wireless communication system comprising:
    a spreading unit for modulating a data signal with a spreading code resulting in a spread-spectrum modulated signal; and
    a phase shifter which shifts the phase of said spread-spectrum modulated signal, wherein said phase shifter further includes:
    a phase controller that controls an amount of the phase shift value.

14. A spread-spectrum modulating apparatus, in a spread-spectrum wireless communication system comprising:
    a spreading unit for modulating a data signal with a spreading code resulting in a spread-spectrum modulated signal; and a phase shifter which shifts the phase of said spread-spectrum modulated signal, wherein said data signal includes a pilot signal inserted at predetermined intervals of data items.

15. A terminal of a spread-spectrum wireless communication system having a base station, said terminal receiving spread-spectrum modulated transmission data on a data channel from said base station, said terminal comprising:

a receiver which receives a data having the phase shifted at the base station; and a demodulator which demodulates said received data.

16. A base station of a spread-spectrum wireless communications system operating on multiple user channels for transmitting a spread-spectrum modulated transmission data on each of said multiple user channels, comprising:

a code generator for generating an individual spread code according to the transmitting user channel;

a spreading unit for modulating a data signal for each of said multiple user channels with said individual spread code and providing a spread-spectrum modulated signal; and a phase shifter which shifts the phase of said spread-spectrum modulated signal.

17. The base station of claim 16, wherein said phase shifter has a phase shifter that shifts the phase by a predetermined value for each of said user channels.

18. The base station of claim 16, wherein said spread-spectrum modulated data contains a pilot signal.

19. The base station of claim 16, further comprising:

a phase controller for controlling said individual phase value of the phase of each of said channels.

20. The base station of claim 16, further comprising:

a storage unit for storing a table of a correspondence between the spreading code and an amount of phase shift value; wherein said phase controller controls said individual phase value of the signal-point position vector by obtaining from the table, a phase shift value corresponding to the spreading code.

21. A spread-spectrum wireless communication apparatus operating on multiple user channels, comprising:

a spreading code generator for generating a spreading code that is different for each of said multiple user channels;

a spreading unit for spreading transmission data including a pilot signal for each of said multiple user channels with the spreading code corresponding to that user channel to provide spread spectrum modulated data for each user channel; and a phase shifter for shifting the phase of the each spread-spectrum modulated data.

22. The spread-spectrum wireless communication apparatus of claim 21, wherein said phase shifter shifts the phase by a predetermined value for each user channel.

23. The spread-spectrum wireless communications apparatus of claim 21, further comprising:

a terminal device for receiving said multiple user channels and restoring received spread spectrum modulated data by the amount of phase shift corresponding to that user channel.

24. A terminal of a wireless communication system having a base station for receiving modulated transmission data from said base station, comprising:

a receiver for receiving a data having the phase shifted at the base station; and a demodulator for demodulating said received data.

* * * * *